(12) United States Patent
Trapnell

(10) Patent No.: US 8,888,112 B2
(45) Date of Patent: Nov. 18, 2014

(54) HAND TROLLEY

(75) Inventor: Kevin Edward Trapnell, Melbourne (AU)

(73) Assignee: Pole May Investments Pty Ltd, Melbourne (AU)

( * ) Notice: Subject to any disclaimer, the term of this patent is extended or adjusted under 35 U.S.C. 154(b) by 0 days.

(21) Appl. No.: 13/820,125

(22) PCT Filed: Aug. 22, 2011

(86) PCT No.: PCT/AU2011/001075
§ 371 (c)(1),
(2), (4) Date: Feb. 28, 2013

(87) PCT Pub. No.: WO2012/027777
PCT Pub. Date: Mar. 8, 2012

(65) Prior Publication Data
US 2013/0161917 A1    Jun. 27, 2013

(30) Foreign Application Priority Data

Aug. 30, 2010 (AU) .................................. 2010903879

(51) Int. Cl.
  *B62B 1/12* (2006.01)
  *B62B 1/14* (2006.01)
(52) U.S. Cl.
  CPC .............. *B62B 1/12* (2013.01); *B62B 2203/74* (2013.01); *B62B 2203/07* (2013.01); *B62B 2203/10* (2013.01); *B62B 1/14* (2013.01)
  USPC .......................... 280/47.29; 414/444; 187/244

(58) Field of Classification Search
  CPC .............. B62B 1/10; B62B 1/12; B62B 1/18; B66B 9/16; B66F 9/06
  USPC ........... 280/47.27, 47.28, 47.29; 414/44, 445, 414/446, 444; 187/22, 244, 240, 242, 243
  See application file for complete search history.

(56) References Cited

U.S. PATENT DOCUMENTS

| 3,225,868 | A  |   | 12/1965 | Barns |           |
| 4,117,561 | A  |   | 10/1978 | Zamotin |         |
| 6,530,584 | B1 | * | 3/2003  | Lucy    | 280/47.29 |
| 6,899,347 | B2 | * | 5/2005  | Neal et al. | 280/47.35 |
| 6,921,095 | B2 |   | 7/2005  | Middleby |        |
| 8,172,255 | B1 | * | 5/2012  | Martin  | 280/651   |

FOREIGN PATENT DOCUMENTS

| AU | 2004100849 A4 | 11/2004 |
| AU | 2006201947 B1 | 1/2007 |

OTHER PUBLICATIONS

International Search Report, PCT/AU2011/001075, mailing date Aug. 3, 2012, 3 pages.
Aussie Trolleys, "The Genius I Lift Handtruck," (front, side and tree views) http://www.aussietrolleys.com.au/items.asp?catID . . . , accessed on Jul. 19, 2010, 3 pages.
Grainger Catalogue, Carts & Trucks Commercial Material Lifts, "Genie Industries, Manually-Operated Genie Lift, Manually Operated—Superlift Advantage," p. 2232.

(Continued)

*Primary Examiner* — John Walters
(74) *Attorney, Agent, or Firm* — Cooley LLP

(57) ABSTRACT

A hand trolley including a main body and a lifting platform movable relative to the main body for lifting a load by a foot force applied by a foot of an operator.

18 Claims, 18 Drawing Sheets

(56) References Cited

OTHER PUBLICATIONS

Industry Search Australia & NZ, "Portable Lifting Trolley (Portalift Handtruck)—Reflex Materials Handling and Stroage," http://www.industrysearch.com.au/Products/Portable-Lifting-Trolley-Portalift-Handtruck-1 . . . , accessed on Jan. 6, 2010, 1 page.

Wikipedia, "Hand Truck," http://en.wikipedia.org/wiki/Hand_truck, accessed on Jul. 19, 2010, 1 page.

* cited by examiner

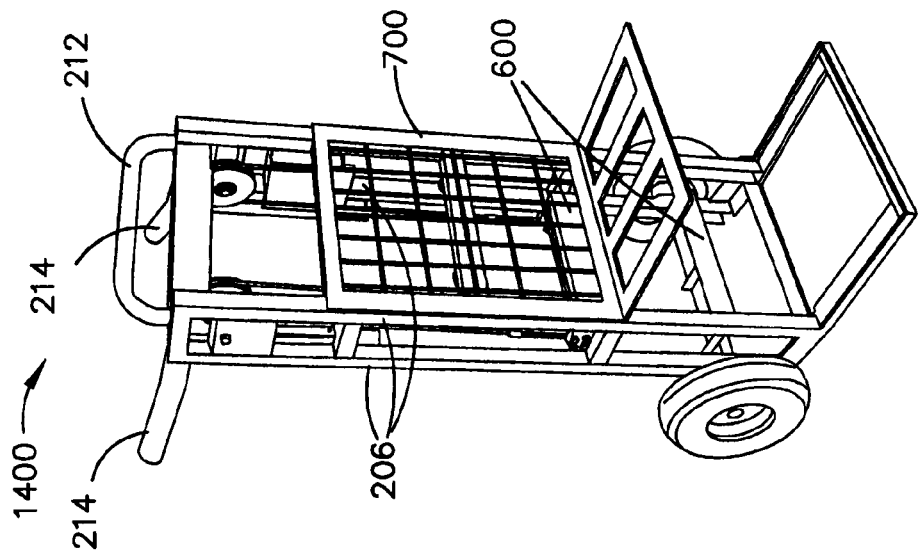
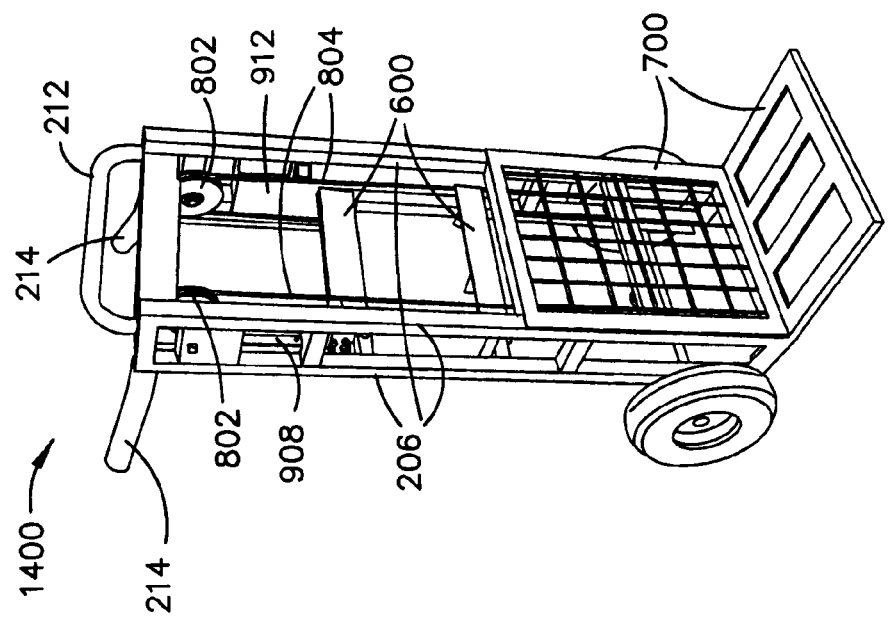

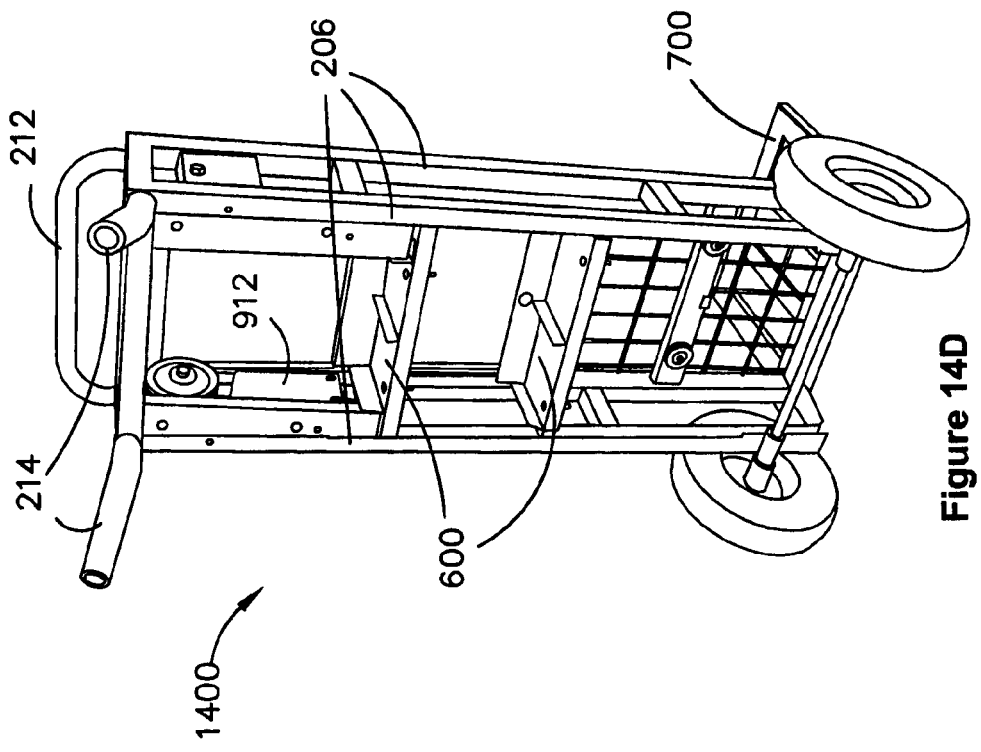
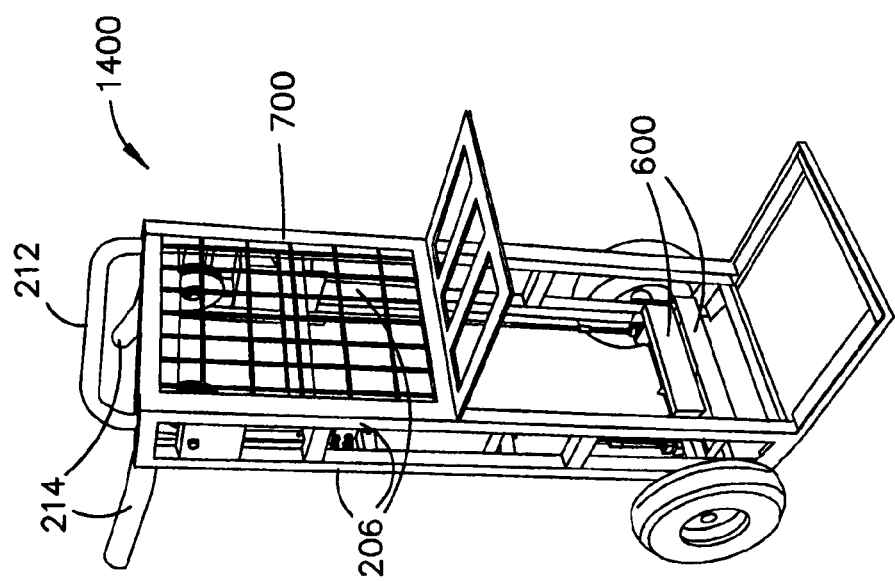
Figure 14D
Figure 14C

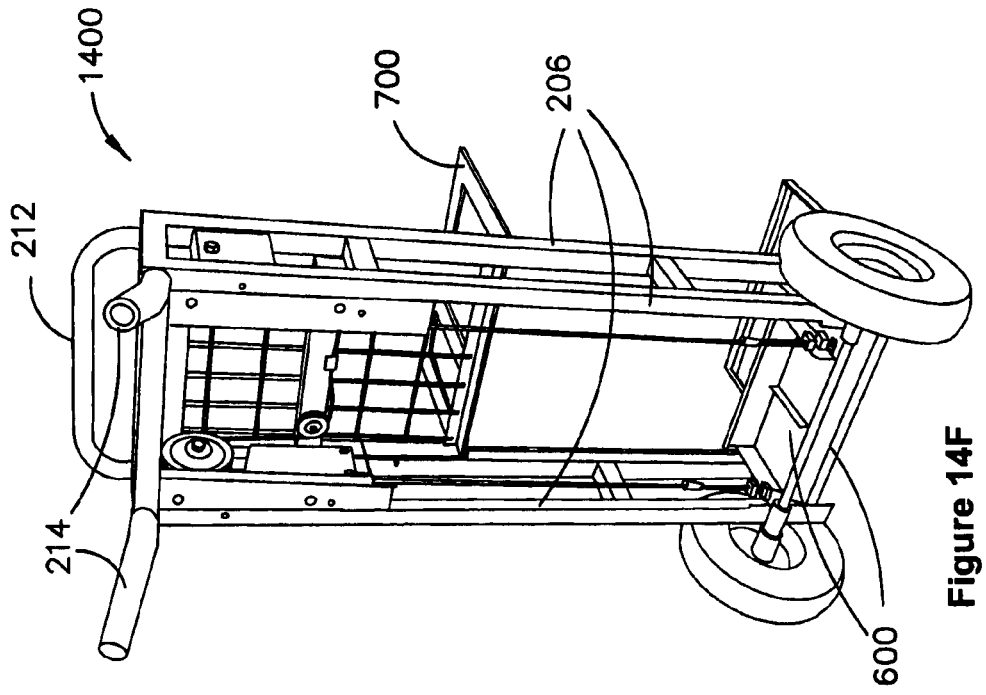
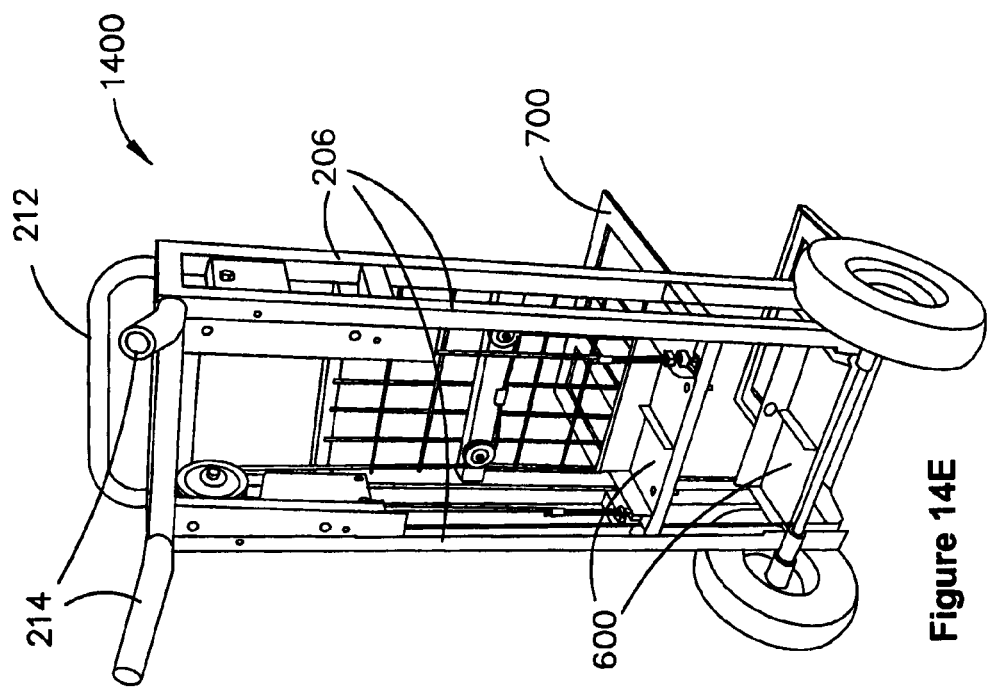

HAND TROLLEY

CROSS-REFERENCES TO RELATED APPLICATIONS

This application is a U.S. national phase application of International PCT Patent Application No. PCT/AU2011/001075, which was filed on Aug. 22, 2011, which claims priority to Australian Patent Application No. 2010903879, filed Aug. 30, 2010. These applications are incorporated herein by reference in their entireties.

FIELD

The present invention relates to hand trolleys for lifting loads, e.g., hand trolleys with unpowered lifts for persons to lift, lower, and transport loads.

BACKGROUND

A hand trolley is a device used by an operator to carry loads. A hand trolley may also be known as a hand truck, a dolly, a two-wheeler, a sack truck, a trolley truck, a sack barrow or a bag barrow. A hand trolley generally has an "L"-shaped side profile, with a base or ledge forming the bottom of the "L" and an upright or back forming the upright part of the "L". Wheels are affixed to the hand trolley at the back of the base (at the corner of the "L" shape), so that loads can be placed on the base from the front of the trolley.

In use, a load is placed on the base, or the hand trolley is moved underneath a load (e.g., by tipping the load away from the hand trolley and wheeling the hand trolley under the load). The upright can then be pulled back, away from the load, thus lifting the load as the hand trolley rotates about an axis defined by an axle of the wheels. The hand trolley thus acts a lever to lift loads from the ground. The hand trolley can be tipped back, e.g., so the centre of gravity of the load is generally aligned over the wheels, thus allowing the hand trolley to be wheeled by hand to easily transport the load. A hand trolley lifts its load, and its base, a short distance from the ground so the loaded hand trolley can roll on its wheels. When the hand trolley is in its standing or stationary condition, the base rests on the ground, and the load is no longer lifted from the ground.

Hand trolleys may be used in domestic, commercial and industrial settings. For example, hand trolleys can be used to transport loads such as bags of building material (e.g., cement) or horticulture and gardening supplies (e.g., bags of soil) in commercial settings (e.g., hardware stores and nurseries) and domestic and industrial settings (e.g., private homes, farms and building sites).

In these settings, there is frequently a need to lift and lower loads, including loads that are typically transported by hand trolleys, between the base of the hand trolley and a significant and substantial distance from the ground, e.g., for storage or transportation. There may be a need to move loads to and from shelves which are some substantial distance from the ground, e.g., for stacking goods in a warehouse or store. Loads may need to be moved to and from transport vehicles or systems, such as utility vehicles, light trucks, car boots/trunks, conveyor belts, etc. For example, an operator may need to lift a load from a hand trolley into their vehicle or back again, e.g., in a hardware supply store or tree nursery.

Across the world, loads of significant weight, e.g., from 10 kg to 200 kg, are being manually lifted by individual persons, or groups of people from hand trolleys into storage or transport devices. Similarly, people are lifting loads from storage or transport devices down to the ground for transport by hand trolley; or in some cases pushing the loads from the raised storage/transport platform onto the ground (e.g., dropping the load from a shelf or vehicle).

To lift a load to a raised platform or area, e.g., for storage or transportation, a hand trolley may be pushed or dragged up a ramp (e.g., a delivery ramp or a plank) to a height at least equal to the raised platform, where the load is delivered. In some situations, however, it may be time-consuming, difficult or impossible to drive a hand trolley into a position generally adjacent to and level with a desired raised area. For example, when stacking loads into shelves, there may be no ramps available on which to drive a hand trolley.

Devices exist to assist with lifting and lowering loads, such as electrically-powered fork lifts, or platforms that can be winched or cranked to different heights; however, these devices can be large, expensive and difficult to manufacture, and unwieldy, difficult and/or slow to operate.

People continue therefore to lift and lower loads unsafely, in ways that may strain or injure the persons and/or damage the loads. For example, people lifting or lowering loads in a manner that is not within their physiological abilities may cause major injuries to themselves, to other people, to equipment, and to the loads. If a load is too heavy, it may be dropped, which may damage the load and/or injure a person (e.g., by falling on the person). Weaker people may find it difficult to lift loads that are normally lifted by strong adults, thus there may be a lack of accessible facilities for lifting these loads.

It is desired to address or ameliorate one or more disadvantages or limitations associated with the prior art, or to at least provide a useful alternative.

SUMMARY

In accordance with the present invention, there is provided a hand trolley including a main body and a lifting platform movable relative to the main body for applying a lifting force to a load by a foot force applied by a foot of an operator.

The present invention also provides a method of operating a hand trolley, including:
applying a downward foot force by a foot to the hand trolley;
converting the downward foot force into a lifting force; and
applying the upward lifting force to a lifting platform of the hand trolley.

The foot force applied by the foot can be referred to as a foot loading. The mechanical energy for the lifting force is provided by a body and muscles of the operator through their foot. The lifting force can be referred to as an upward force, and can be used to lift or to lower the load.

The hand trolley can include at least one member engageable by the foot and a lifting mechanism, the lifting mechanism being mechanically associated with the member and the lifting platform to apply the lifting force to the lifting platform based on the foot force applied to the member. The at least one foot-engageable member can be referred to as a foot platform, or a pedal, or a part of a pedal to which the foot force is applied.

The hand trolley can include a hold-release assembly (e.g., connected to the main body) to hold the lifting platform in a raised condition and to release the lifting platform from the raised condition.

The hold-release assembly can be configured hold the lifting platform at a plurality of heights (relative to the main body).

The hold-release assembly can include one or more rods that move (e.g., relative to the main body and the lifting platform) to a holding condition to hold the lifting platform in the raised condition.

The hold-release assembly can include one or more releasing mechanisms (e.g., release handles configured for manual operation) for operation by the operator to release the lifting platform (e.g., by releasing the rods).

The hand trolley can include a lifting apparatus configured to receive the foot force in a plurality of stages for applying the lifting force.

The lifting apparatus can include (e.g., in the at least one foot-engageable member): a lower member (connected to the lifting mechanism) for receiving the foot force in a first stage; and an upper member (connected to the lower member) for receiving the foot force in a subsequent second stage.

The hand trolley can include a contractible link between the lower member and the upper member that defines a maximum separation of the upper member and the lower member.

The contractible link can include at least one inner member (e.g., connected to the lower member or the upper member), and at least one housing (e.g., connected to the upper member or the lower member respectively), the housing configured to slide over the inner member to contract the contractible link (e.g., to guide the contractible link vertically relative to the main body).

The lower member can be connected to the upper member such that applying the downward force to the lower member can apply the lifting force, and applying the downward force to the upper member can displace the upper member downward relative to the lower member and apply the lifting force.

The lower member can be connected to the upper member to via a contractible link to apply the lifting force.

The hand trolley can include at least one axle connected to the main body defining a rotational axis of the hand trolley, wherein the foot force is applied on the same side of the rotational axis as the lifting platform such that the foot force and a weight of the load act in the same direction around the rotational axis. The foot-engageable member can be located on the same side of the rotational axis for the same reason. The axle can include two stub axles.

The hand trolley can include (e.g., in the lifting mechanism): at least one pulley (e.g., fixed relative to the main body and/or the lifting platform); and a line in tension around the pulley (e.g., the line can be connected to the lifting platform, and the member) to apply the lifting force based on the foot force.

The hand trolley (e.g., in the main body) can include at least one handle configured (e.g., arranged relative to the main body) for the operator to pull up on to apply the foot force.

The hand trolley can include (e.g., in the foot-engageable member) at least one foot platform configured or shaped to receive the foot of the operator to apply the foot force.

The foot platform can include a safety guard between the foot platform and moving parts of the hand trolley.

The hand trolley can include an extension member connected to the lifting platform for carrying the load to and from the lifting platform (e.g., for loading and unloading the load to and from the lifting platform).

The hand trolley can include (e.g., in the main body) a carrying tray adjacent the lifting platform for carrying the load when moving (e.g., pushing or pulling) the hand trolley.

The lifting platform can move a distance substantially equal to a distance moved by the foot while applying the foot force. The lifting force and the foot force can have substantially the same magnitude (or strength). The mechanical advantage of the lifting apparatus can be substantially unity (or one).

The method can include: applying the downward foot force in a plurality of stages; and applying the lifting force in a corresponding plurality of stages.

The method can include moving (downward or upward) a foot-engageable member by a selected distance with the foot, and moving (upward or downward respectively) the lifting platform by a corresponding distance.

BRIEF DESCRIPTION OF THE DRAWINGS

Preferred embodiments of the present invention are hereinafter further described, by way of example only, with reference to the accompanying drawings, in which:

FIG. 14A is a diagram of a front perspective view of a prototype hand trolley in a rest condition;

FIG. 14B is a diagram of a front perspective view of the prototype hand trolley in a partial lift condition;

FIG. 14C is a diagram of a front perspective view of the prototype hand trolley in a full lift condition;

FIG. 14D is a diagram of a rear perspective view of the prototype hand trolley in the rest condition;

FIG. 14E is a diagram of a rear perspective view of the prototype hand trolley in the partial lift condition;

FIG. 14F is a diagram of a rear perspective view of the prototype hand trolley in the full lift condition;

DETAILED DESCRIPTION

Overview

Figure 1A:
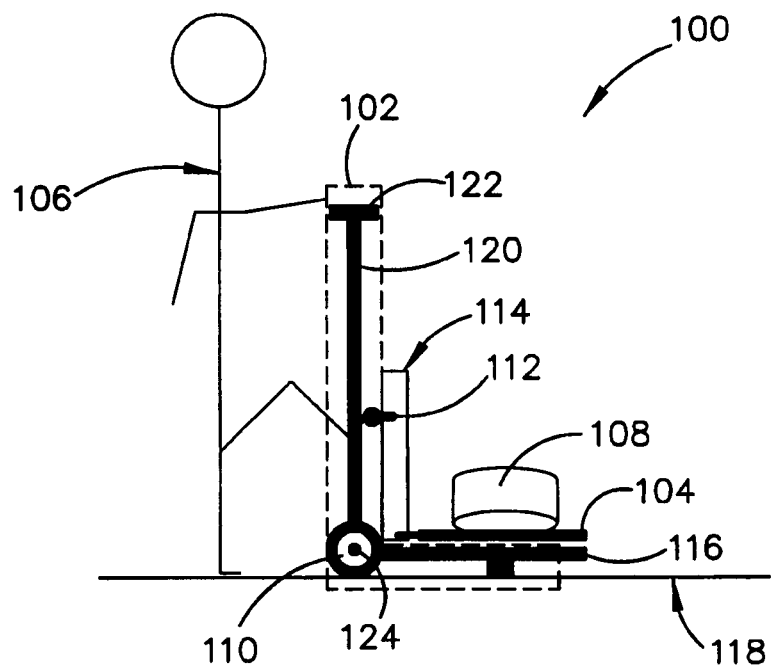
FIG. 1A is a schematic diagram of a hand trolley with a lifting platform in a rest condition.

A hand trolley 100, which includes a main body 102 and a lifting platform 104, as shown in FIG. 1A, can be used by an operator 106 (who is a person, and is also referred to as a user) for both carrying a load 108 for transport (by tipping the hand trolley 100 towards the operator 106 and moving the hand trolley 100 which rolls on its wheels 110), and moving the load 108 relative to the main body 102 by lifting or lowering the lifting platform 104 using a force (which is also referred to as a loading) applied by the operator 106.

The applied force or loading is applied using one or both of the operator's feet. As the loading is applied by a person's foot, it is also referred to as a foot force, a pedal force, a pedal loading, a pedomotive force, or a pedomotive loading. By applying the loading through the operator's foot or feet, the operator 106 can use many of their strongest muscle groups to apply the loading. The applied force includes at least some vertical or downward component, and this is referred to as a vertical loading, a vertical force, a downward loading, or a downward force.

The hand trolley 100 includes a lifting apparatus, which includes a movable member 112 (which is also referred to as a foot-engageable member, a movable foot platform, or a pedal) to which the operator 106 can apply the loading using one or both of their feet. The loading applied to the movable member 112 is transferred, or transformed, into a lifting force applied to the lifting platform 104 by a lifting mechanism 114 (which is also referred to as a lift) in the lifting apparatus. The lifting mechanism 114 is mechanically associated with both the movable member 112 and lifting platform 104. The lifting mechanism 114, and thus potentially the entire hand trolley 100, can therefore be unpowered, i.e., no additional motors, power sources or engines need be required for lifting and lowering the load 108.

With the hand trolley 100 in a rest condition, the lifting platform 104 is located generally adjacent a base 116 of the main body 102 of the hand trolley 100, as shown in FIG. 1A. In the rest condition, the load 108 rests on the lifting platform 104 which rests on the main body 102, which is in turn supported on the ground 118 by the wheels 110 and the base 116 which contacts the ground 118. In the rest condition, the operator 106, with other persons if required, can shift the load 108 onto the hand trolley 100 for transport, and shift the load 108 from the hand trolley 100 for storage etc. In the rest condition, the lifting platform 104 is close to the ground 118 so the hand trolley 100 can be wheeled under a raised part of the load 108 that is tipped away from the hand trolley 100. With the base 116 and the lifting platform 104 under the load 108, it can be tipped back towards the hand trolley 100 to move the load 108 onto the lifting platform 104.

The wheels 110 can have gel-filled tyres which have a lesser likelihood of tyre deflation than air-filled tyres. Tyre deflation may be dangerous. Tyre deflation may cause the hand trolley 100 to become unstable due to the wheels 110 no longer correctly supporting the main body 102. When properly inflated, the wheels 110 support the main body 102 on the ground 118 such that the weight of the main body 102, and any additional weight applied by the operator 106, tend to tip or rotate the hand trolley 100 towards the base 116. This provides for the applied loading, the weight of the hand trolley 100 and the weight of the load 108 to act in the same direction around the rotational axis defined by the wheels 110. In contrast, deflated tyres may cause the main body 102 to tip backwards, particularly when in use, thus endangering the operator 106.

The hand trolley 100 includes an upright 120 which comprises one or more members rigidly connected with the base 116 to form an "L"-shaped profile of the hand trolley 100. The main body 102 includes one or more main handles, including a handle 122 towards the upper end of the upright 120 for grasping by the operator 106. By using the handle 122, the operator 106 can tip the upright 120 of the hand trolley 100 backwards, towards themselves, and thus lift the base 116 and the lifting platform 104 away from the ground in a simple lever action as the hand trolley is rotated about a rotational axis 124 defined by an axle or axles of the wheels 110. The handle 122 is arranged relative to the main body 102 on the upper end of the upright 120 to allow the operator 106 to grasp the handle 122 when operating the movable member 112, and to provide a longer lever arm for rotating the hand trolley 100 to lift the load. The handle 122 is positioned so the operator 106 can stabilise themselves when applying force to the movable member 112, e.g., when pressing on the movable member 112 with one foot, or when standing on the movable member 112 with both feet. The handle 122 is arranged so the operator 106 can pull up on the handle 122 when applying force to the movable member 112, and thereby apply an amount (or a magnitude) of the applied loading that is greater than the operator's weight. For example, the operator 106 can stand on the movable member 112, thereby applying a force or loading on the movable member 112 due to the operation of gravity on the mass of the body of the operator; the operator 106 can then effectively increase this loading by pulling up on the handle 122, thereby applying an additional downward force on the movable member 112 based on the pulling force applied to the handle 122. The pulling force on the handle by the operator 106 can be based on a combination of the muscular strengths of the operator's arms, back and legs, etc.

The lifting platform 104 can be moved relative to the main body 102 by the applied loading for both raising the lifting platform 104 and lowering the lifting platform 104. The operator 106 can apply more loading for lifting the lifting platform 104 up, and less loading for lowering the lifting platform 104 down in a controlled manner (i.e., controlled by the operator 106). The operator 106 can control the amount of loading applied to move the lifting platform 104 by controlling the fraction of their total body weight applied to movable member 112, and/or by pulling up or down on the handle 122 of the main body 102.

The movable member 112, and thus the lifting apparatus, is arranged to receive the applied loading on the same side of the rotational axis 124 as the base 116, as shown in FIG. 1A where the movable member 112 is forward of the rotational axis 124. By receiving the loading of the operator 106 on the same side of the rotational axis 124 as the base 116, the hand trolley 100 supports both the load 108 and the operator 106 between the wheels 110 and the base 116 when the hand trolley 100 is in a standing condition. If the operator's loading were to be applied on the opposite side of the rotational axis 124 from the base 116 when the hand trolley is in the standing condition, the loading applied by the operator 106 would tend to rotate the hand trolley 100 towards the operator 106, thus opposing the force applied by gravity to the load 108 (and to parts of the hand trolley 100 including the lifting platform 104 and the base 116), thus making the hand trolley 100 unstable, particularly if the load 108 is lighter than the operator 106. In this way, the operator 106 can lift the lifting platform 104 using the movable member 112 while the hand trolley remains stable in the standing condition.

Figure 1B:
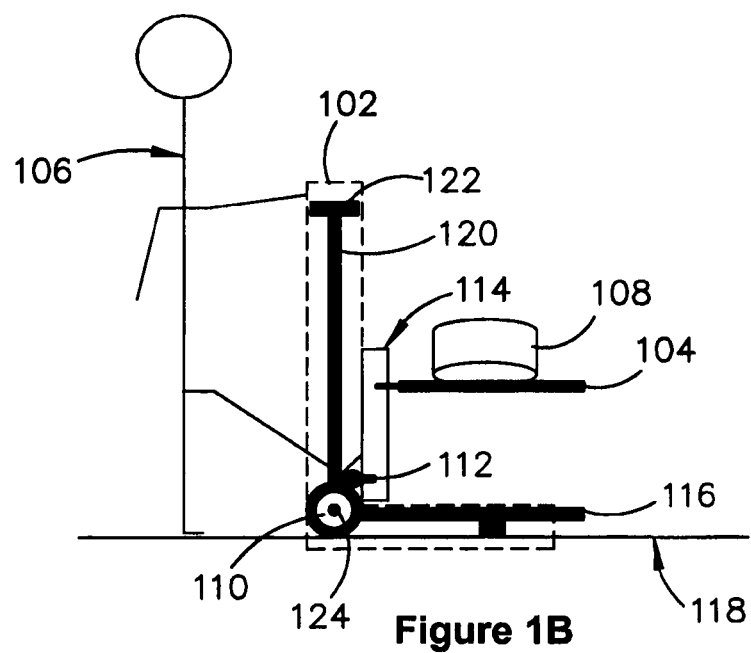
FIG. 1B is a schematic diagram of the hand trolley with the lifting platform in a raised condition.

The lifting platform 104 is moved relative to the main body 102 by the applied loading for both raising the lifting platform 104 and for lowering the lifting platform 104. In the rest condition, the lifting platform 104 is generally adjacent and supported by the base 116, as shown in FIG. 1A. In the raised condition, the lifting platform 104 is raised away from the base 116 by the lifting mechanism 114, and the movable member 112 is moved towards the base 116, as shown in FIG. 1B. To raise the lifting platform, the operator 106 steps down, presses down or stomps with their foot on the movable member 112, which generates a force, through the lifting mechanism 114, to raise the lifting platform 104. To lower the lifting platform 104, the operator 106 applies the loading by their foot (or feet) to the movable member 112 and then reduces the loading (e.g., a portion of their weight) applied to the movable member 112, thus allowing the lifting platform 104 to descend under the force of gravity acting on the lifting platform 104 (and the load 108 if it is present), controlled by the applied portion of the operator's weight (i.e., the downward force applied by the operator through their foot or feet). The operator 106 can therefore control the height of the lifting platform 104 relative to the main body 102 of the hand trolley 100 by controlling the magnitude or amount of the vertical force or loading applied through their foot or feet. For a very heavy load 108 as mentioned above, the operator 106 can apply the loading including their whole weight together with an additional downward pulling force generated by the operator 106 by pulling up on the handle 122.

The lifting apparatus can be configured to have a mechanical advantage of unity or one. Thus the applied foot force is transferred by the lifting mechanism 114 into the lifting force with equal magnitude or strength (but different direction). This amount of force is sufficient for lifting many loads. By having a mechanical advantage of about unity, the load 108 moves about the same distance that the movable member 112 is moved, thus a load can be lifted or lowered by a distance equal to a step height of the operator in a single stroke (which may be one of a plurality of strokes in corresponding lifting stages), which can allow more rapid raising and lowering of loads compared to devices using significant non-unity mechanical advantage, e.g., winch-based systems. The lifted height associated with a small number (e.g., one, two, or three) of human steps can be sufficient to lift the load 108 to a convenient height for storage or transport (e.g., onto shelves or utility vehicles). The mechanical advantage may be about one, e.g., about 80%, 85%, 90%, 95%, 100%, 105%, 110%, 115%, 120%, etc., selected based on the operator's expected strength and weight, and expected weights of the loads (and the ratios of the distances moved by the load 108 and the member 112—and the forces acting on the member 112 and the load 108—correspond to the mechanical advantage ratios).

Example Hand Trolley 200

An example hand trolley 200 (as shown in FIGS. 2, 3, 4 and 5), includes a main body in the form of a welded steel frame 202 and plastic wheels 204.

The example hand trolley 200 includes at least one movable member for receiving the downward vertical force or loading applied by the operator in the form of an apparatus that includes one or more movable members. These movable members can include steps 600, as shown in FIGS. 2, 3, 4, 6A and 6B, which include a first step 602 (also referred to as a lower member or lower step) and second step 604 (also referred to as an upper member or upper step).

Figure 7A:
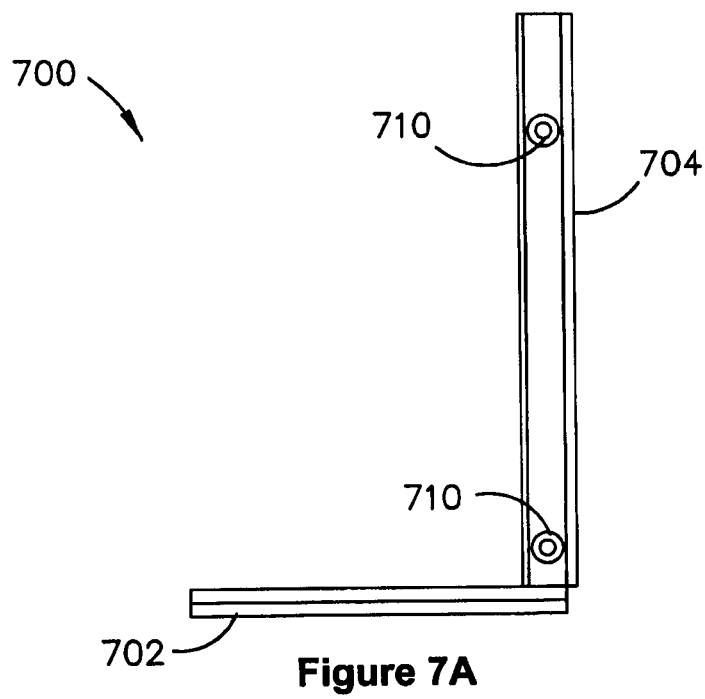
FIG. 7A is a diagram of a side view of an example lifting platform of the example hand trolley.
Figure 7B:
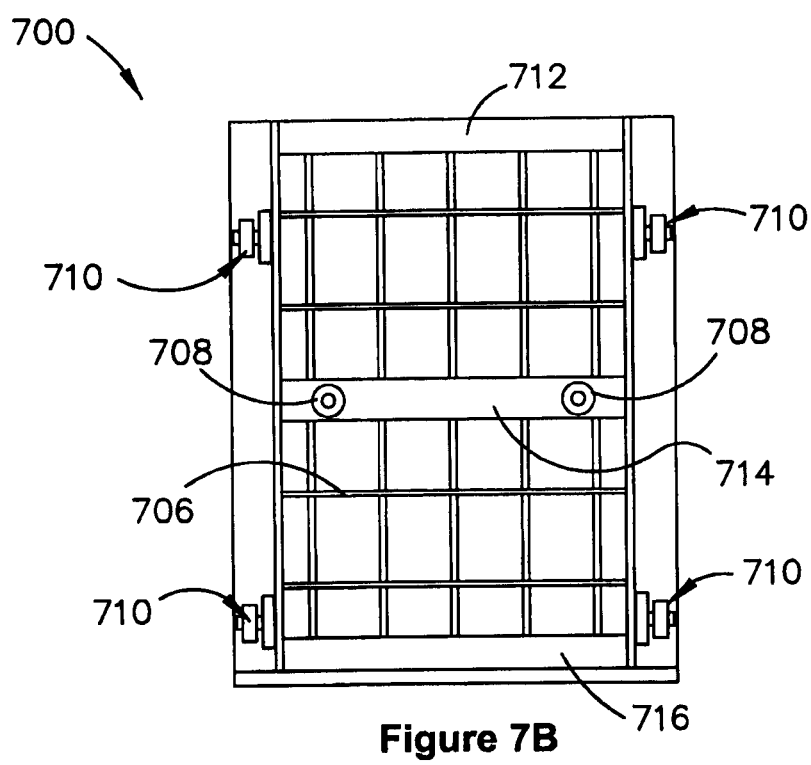
FIG. 7B is a diagram of a back view of the example lifting platform.
Figure 8A:
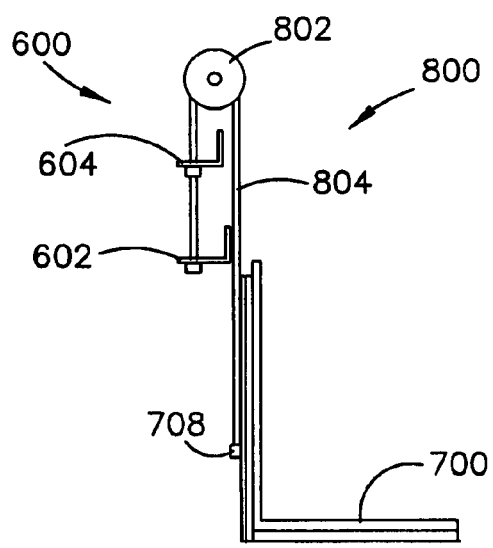
FIG. 8A is a diagram of a side view of a pulley-based lifting apparatus of the example hand trolley with a lift platform in a rest condition.
Figure 8B:
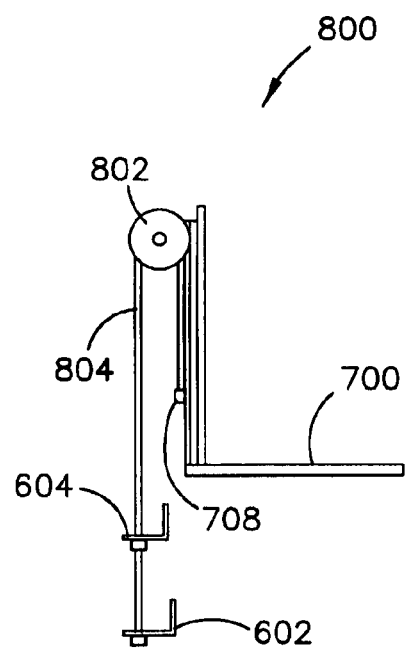
FIG. 8B is a diagram of a side view of the pulley-based lifting apparatus with the lift platform in a partial lift condition.
Figure 8C:
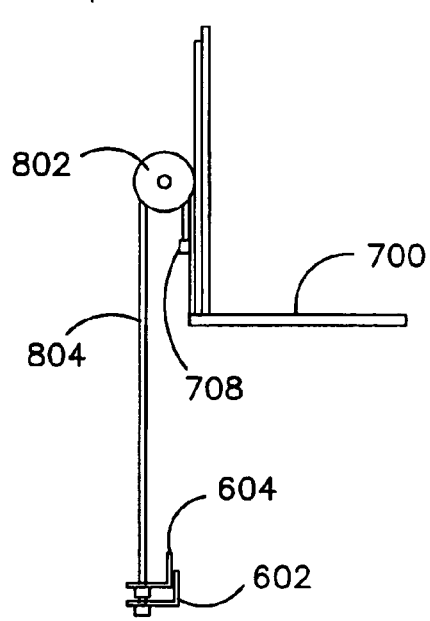
FIG. 8C is a diagram of a side view of the pulley-based lifting apparatus with the lift platform in a full lift condition.
Figure 9:
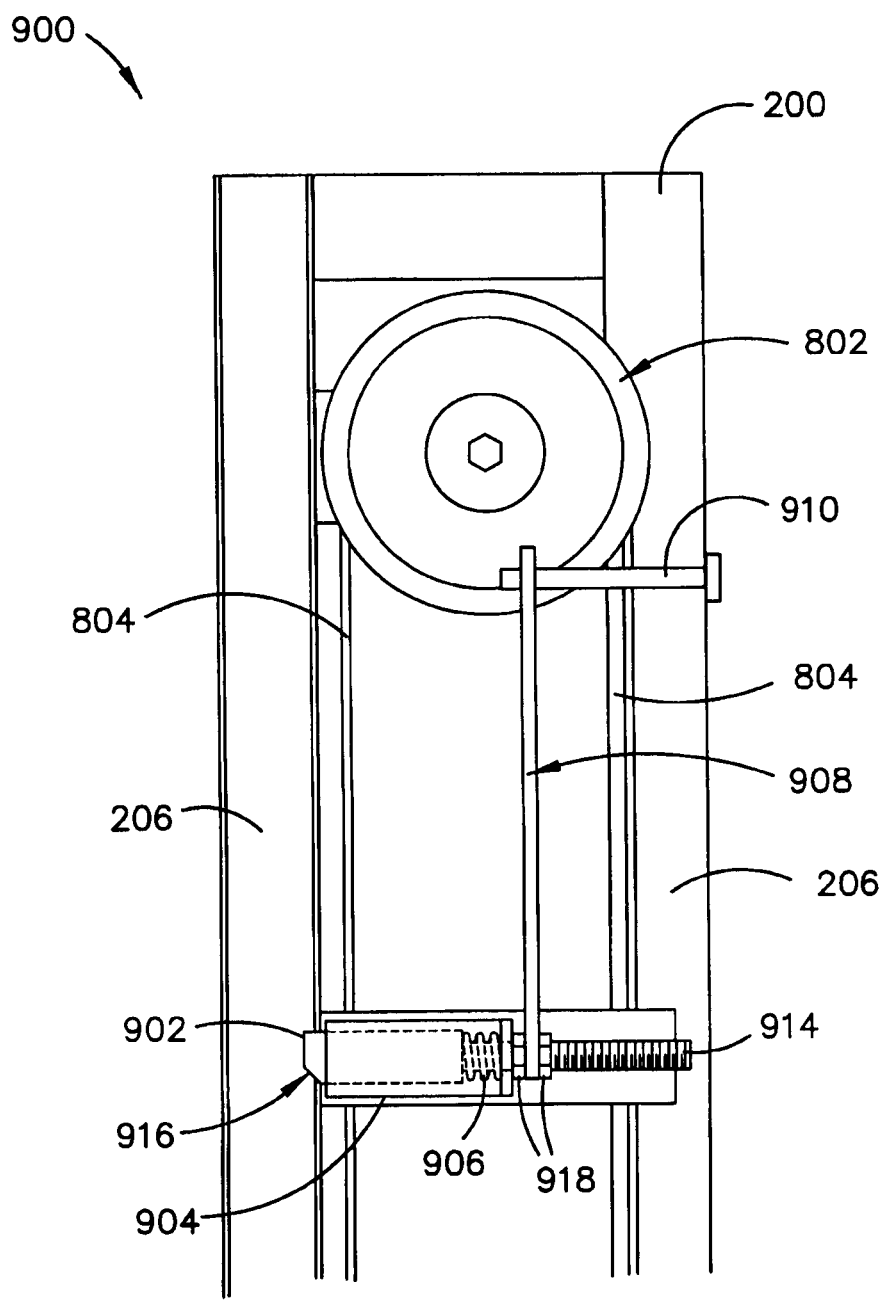
FIG. 9 is a diagram of a side view of an example hold-release assembly of the example hand trolley.

The example hand trolley 200 includes a lifting platform in the form of a welded steel lift platform 700, which includes a lift base 702 and a lift upright 704, as shown in FIGS. 7A and 7B. The example hand trolley 200 includes a lifting mechanism in the form of a pulley-based lifting apparatus 800, which includes twin pulleys 802 and a stainless steel cable 804 running over the twin pulleys 802 and connected to the steps 600 at one end and to the example lift platform 700 at the other end, as shown in FIGS. 8A, 8B and 8C. The cable 804 is a form of a line in tension, and other tension lines may be usable in its place. The example hand trolley 200 includes an example hold-release assembly 900 affixed to the frame 202, as shown in FIG. 9, for holding the lift platform 700 in a raised or lifted condition relative to the base.

Figure 2:
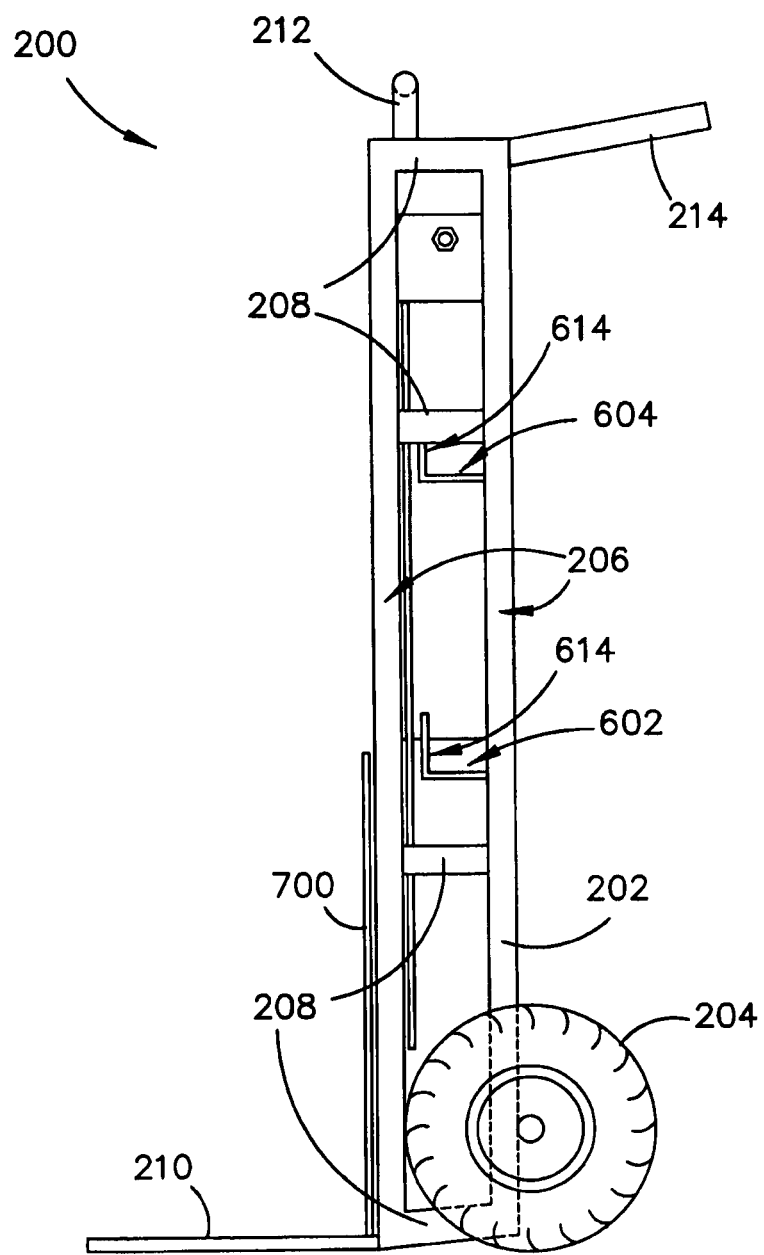
FIG. 2 is a diagram of a side view of an example hand trolley.
Figure 3:
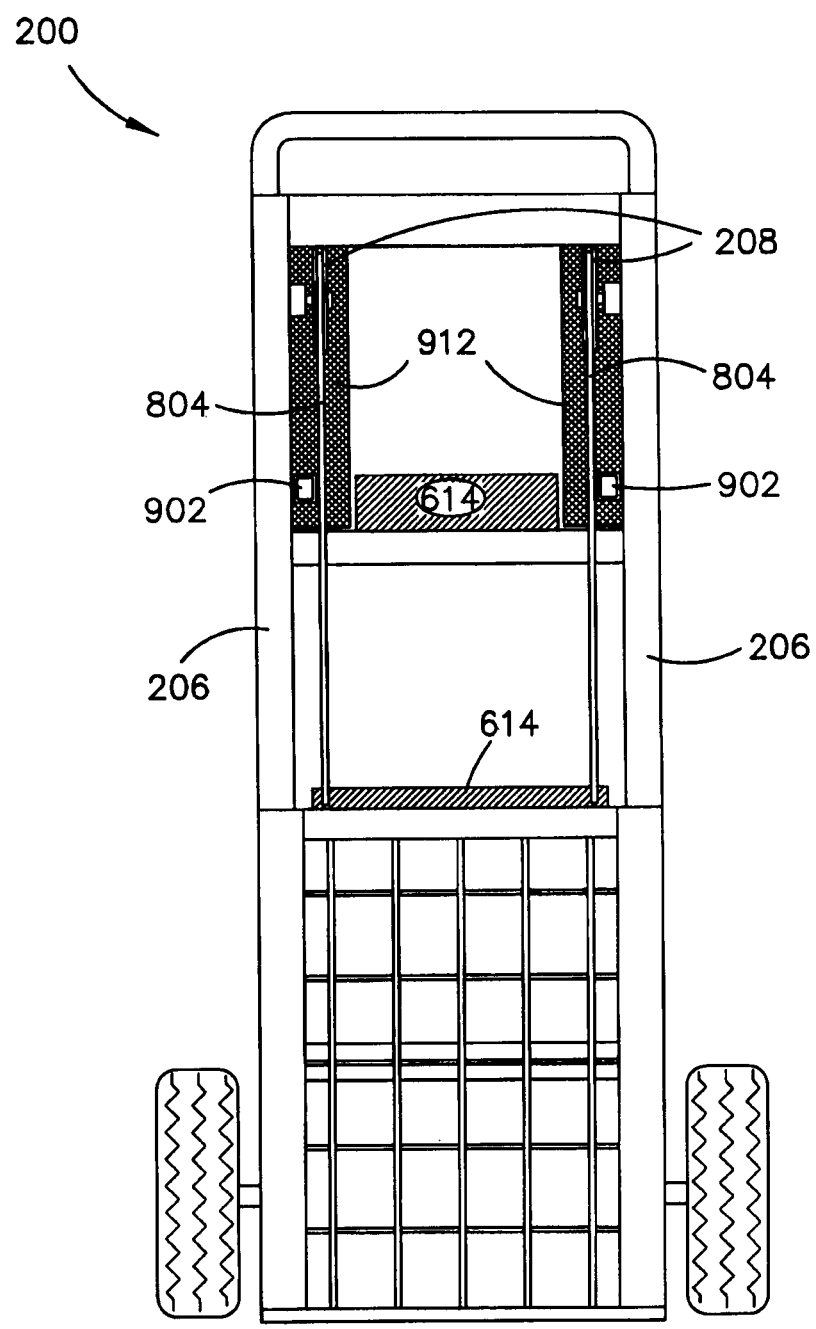
FIG. 3 is a diagram of a front view of the example hand trolley in the rest condition.

The upright portion of the frame 202 is formed of two generally parallel C sections 206 on either side of the frame 202, as shown in FIGS. 2 and 3. The C sections 206 are formed of 1.6-mm thick steel tubes in a "C" shape with approximate cross-sectional square dimensions of 30 mm by 30 mm. The C sections 206 are approximately 1100 mm tall (i.e., about 1 meter in length), which generally defines the height of the example hand trolley 200. The C sections 206 are held at the four corners of the frame 202 when viewed from above by horizontal side cross bars 208 welded between the two C sections 206 on each side of the example hand trolley 200, and by two parallel top cross bars and two parallel bottom cross bars 404 (as shown in FIG. 4) extending between the ends of the C sections 206 between two parallel C sections 206 at the front of the frame 202 and between the two parallel C sections 206 at the back of the frame.

Figure 5:
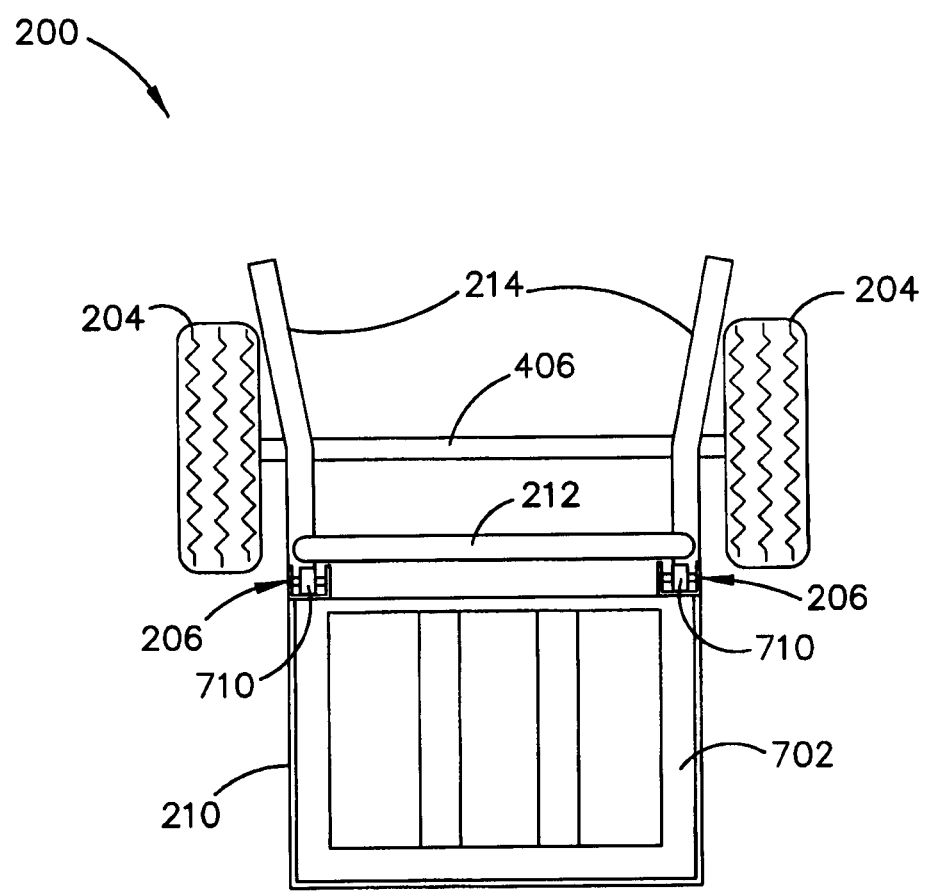
FIG. 5 is a diagram of a top view of the example hand trolley in the rest condition.

The frame 202 includes a frame base 210 which lies below and fits around the lift base 702, as shown in FIG. 5. The frame base 210 has an approximate height of 12 mm (i.e., about half an inch), as shown in FIG. 2, and an approximate front-to-back length of 300 mm and a side-to-side width of 420 mm, as shown in FIG. 5. The height of the frame base 210 is selected to be thin for sliding under loads, and to minimise lifting of loads onto the frame base 210. The size of the frame base 210 is defined by the size of the lift base 702 (and vice versa) as the frame base 210 is configured to receive and support the lift base 702. The frame base 210 is formed of welded steel members affixed to the upright portion (including the C sections 206) of the frame 202.

The size of the frame base 210 and the size of the lift base 702 are selected to provide a sufficiently large platform for carrying and lifting typical loads, e.g., building materials and appliances used in commercial, domestic or industrial settings. For example, the lift base 702 can be configured to support bags of soil or cement which weigh about 50-100 kg. The size of the frame base 210 is selected to provide stability to the example hand trolley 200 when in the standing condition, i.e., to provide a large base area relative to the height of the example hand trolley 200, to reduce the dangers of the example hand trolley 200 tipping over.

Figure 4:
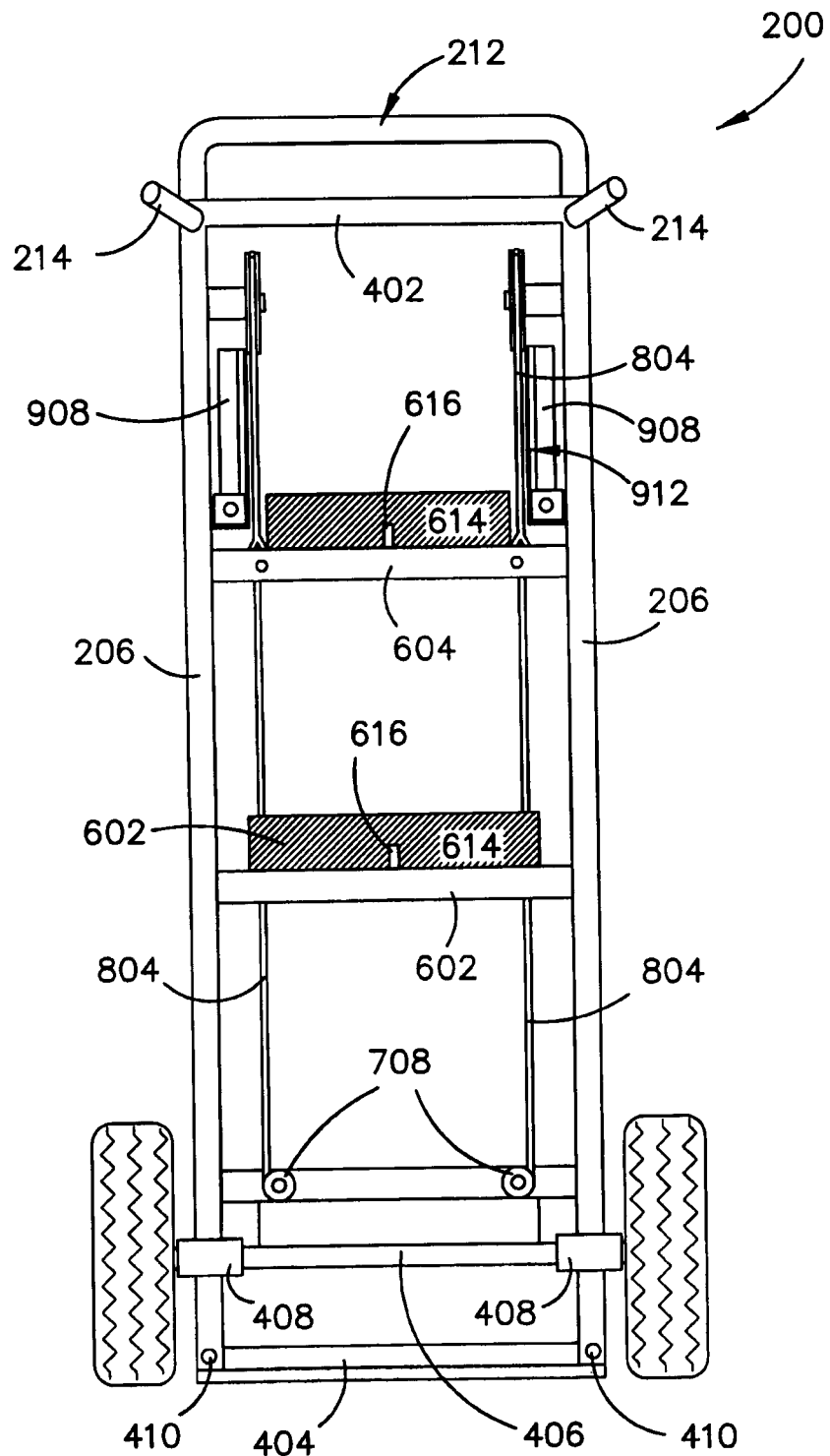
FIG. 4 is a diagram of a back view of the example hand trolley in the rest condition.

The wheels 204 are affixed to a common/shared steel axle 406, as shown in FIG. 4, formed of 18-mm thick steel. The axle 406 is affixed to the frame 202 by two collinearly aligned bearings in the form of bushings 408 welded to the two back C sections 206, as shown in FIG. 4. The wheels 204 include rubber tyres on steel rims and have approximate diameters of 250 mm and widths of 80 mm. The bushings 408 are attached to the rear of the frame 202 so that the rotational axis of the axle 406 is located behind the frame 202: thus, with the example hand trolley 200 in its standing condition, the weight of the frame 202 and the other components of the hand trolley 200 is borne generally on the front or forward side of the axle 406, as shown in FIGS. 2 and 5. Thus the weight of the example hand trolley 200, the weight of any load on the lift platform 700, and the loading applied by an operator on the steps 600, are applied on the same side of the rotational axis of the wheels 204, thus providing stability and safety when the example hand trolley 200 is loaded by a load and/or an operator. Receiving the applied loading of the operator on the same side of the rotational axis as the frame base 210 allows the example hand trolley 200 to support the load 108 and the applied loading between the wheels 204 and the base 116 when in the standing condition; if the weight of the frame 202, the load and the operator were to be even partially balanced on opposite sides of the rotational axis of the wheels 204, the wheels 204 would act as a pivoting axis, and the frame base 210 may at least partially lift from the ground, thus allowing the loaded example hand trolley 200 to move and be unstable and dangerous.

The one or more main handles of the example hand trolley 200 include a top handle 212 and two side handles 214, as shown in FIGS. 2, 4 and 5. The top handle 212 includes a generally straight central portion that is generally parallel to the axle 406 lying across the top of the frame 202, and connected to the frame by two bent side portions, as shown in FIG. 4. The top handle 212 is spaced from the frame 202 by about 55 mm (i.e., about 2 inches) to allow an operator's hand to grip the top handle 212 when the operator is standing behind the example hand trolley 200, thus allowing the operator to stabilise themselves, and to pull up, when pressing or standing on the steps 600 during operation of the example hand trolley 200. The top handle 212 is formed of a 25-mm diameter hollow steel tube welded to the frame 202. In some example hand trolleys, a rubber grip can be fitted to the top handle 212. The side handles 214 project away from the frame 202, generally parallel to the frame base 210 and the ground, to the other side of the axle 406 from the frame base 210, as shown in FIG. 5. The side handles 214 extend a distance of about 200 mm from the back side of the frame 202 and are angled upwards from the frame 202 at an angle of about 15 degrees upwards from the flat (i.e., angled upwards with respect to the ground and the frame base 210), as shown in FIG. 2. The side handles 214 are also angled outwards from the frame 202 so the distal ends of the side handles 214 are spaced more widely apart than the proximal ends, which are attached to the frame 202. Each of the side handles 214 is angled at about 15 degrees from a line parallel to the sides of the frame 202, as shown in FIG. 5. The side handles are formed of 25-mm diameter hollow steel tubing with rubber grips affixed to the tubing. The side handles 214 can be used by an operator for stabilising themselves when pressing or standing on the steps 600 and for steering and carrying (i.e., pushing or pulling) the example hand trolley 200 when moving it from place to place by rolling on the wheels 204 (which may or may not include carrying or transporting a load).

Steps 600

The steps 600 include the first step 602 and the second step 604 which slide vertically (i.e., up and down) along the upright portion of the frame 202. The steps 600 provide the applied loading to the lift platform 700 in two stages.

The steps 600 are configured to act together to provide a form of the movable member 112 to receive the loading applied by the foot or feet of the operator. The second step 602 is affixed to two portions of the steel cable 804 using anchor bolts 606 attached to the second step 604. The anchor bolts 606 are ⁵⁄₁₆-inch bolts and the steel cable 804 is a 5-mm diameter stainless steel cable. The steel cable 804 hangs from the twin pulleys 802, as shown in FIG. 8A, and is held in tension by the weight of the second step 604 on the backside of the twin pulleys 802. The steel cable 804 is affixed to the second step 604 in two places that are generally symmetrically arranged about the centre of the second step 604, and towards the side edges of the second step 604, so one or more feet of an operator can fit between the portions of the steel cable 804 affixed to the second step 604, and so that tension applied to the portions of the steel cable 804 by the loading force applied to the second step 604 is approximately equally distributed between the two portions of the steel cable 804 affixed to the second step 604.

Figure 6A:
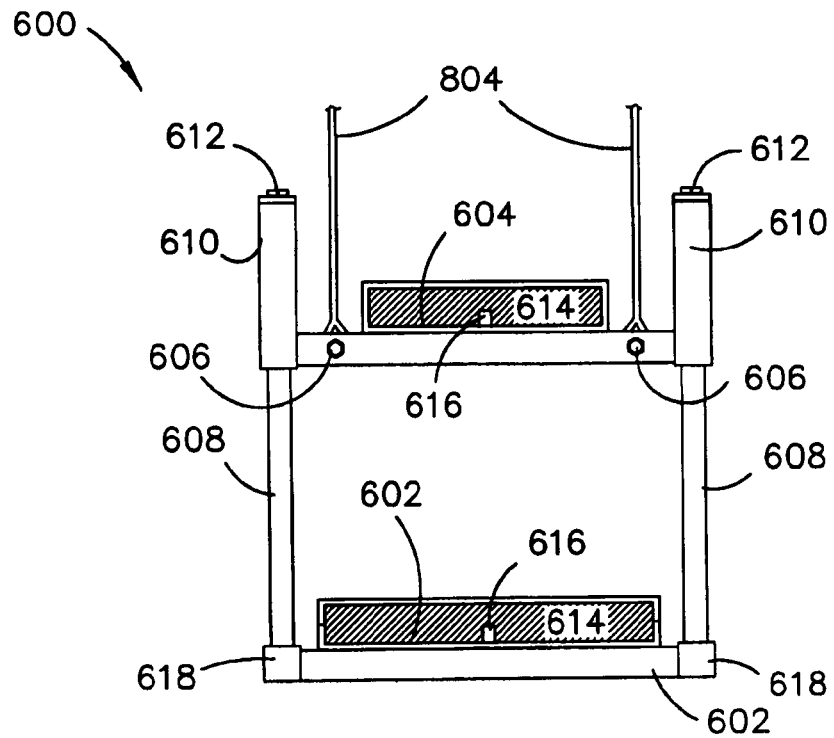
FIG. 6A is a diagram of a rear view of steps of the example hand trolley with its lifting platform in the rest condition.
Figure 6B:
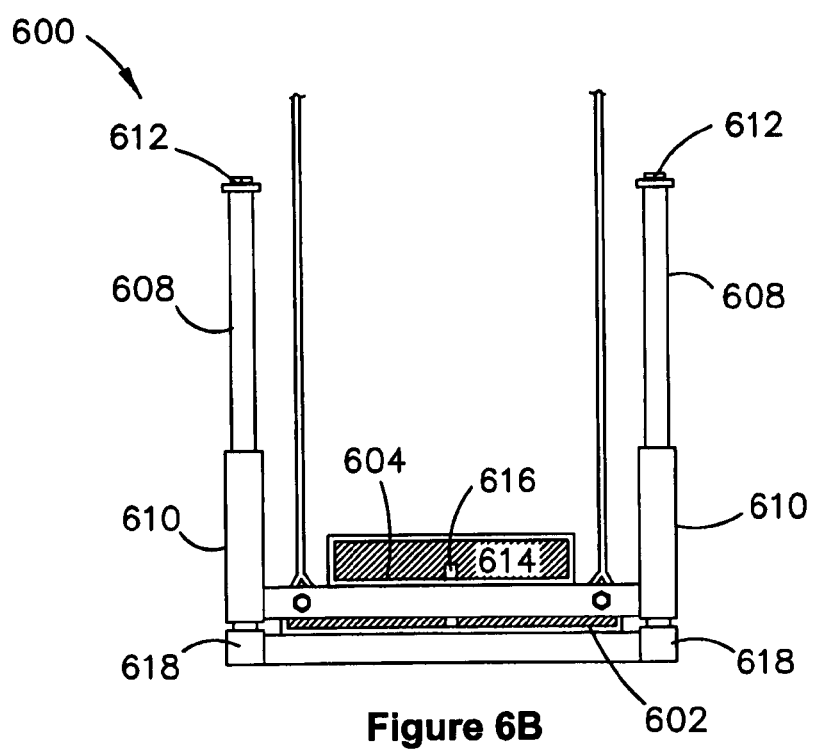
FIG. 6B is a diagram of a rear view of the steps of the example hand trolley with its lifting platform in a fully raised condition.

The first step 602 is connected to the second step 604 by a contractible link that allows the downward loading force applied to the first step 602 to be transferred to the second step 604 (and thus to the attached portions of the steel cable 804). The contractible apparatus (also referred to as a compressible apparatus) defines a maximum separation of the first step 602 and the second step 604. The contractible link includes two inner members in the form of two inner tubes 608 rising upward from the side edges of the first step 602 to at least the position of the second step 604 in the rest condition, as shown in FIG. 6A. From the bottom of the first step 602, the inner tubes 608 extend vertically (i.e., up the frame 202) by a distance of about 390 mm (i.e., about 1.3 ft), while the bottom of the second step 604 is about 240 mm above the bottom of the first step 602, as shown in FIG. 6A. The heights of the two steps 600 are about 25 mm or 30 mm. The second step 604 includes two sliding housings in the form of two outer tubes 610 that fit around the inner tubes 608 and allow relative sliding movement between the outer tubes 610 and the respective inner tubes 608, thus allowing the steps 600 to move from the rest condition, shown in FIG. 6A to the raised condition, shown in FIG. 6B, in which the two steps 600 are generally adjacent one another. The inner tubes 608 include retainers 612 at the top of the inner tubes 608, as shown in FIGS. 6A and 6B. The retainers include a ⅜-inch steel bolt threaded into each of the inner tubes 608 and a retaining washer held by the bolt to the top of each of the inner tubes 608, where the washer extends into a cross-sectional area greater than that of each inner tube 602, and greater than that of the inner diameter of each of the outer tubes 610. For example, each inner tube can be a square steel tube with 20-mm sides and a 1.6-mm thickness, the outer tubes can be 25-mm sided square tubes of 1.6-mm thick steel and the retaining washer can be a 25-mm sided square steel washer. The contractible link is contractible or compressible in the sense that the first step 602 can apply a pulling or tension force to the second step 604 to draw it downwards when the first step 602 is pushed down; but the second step 604 can be pushed closer to the first step 602 because the contractible link is compressible, thus allowing the two steps 600 to be brought closer to each other but still defining a maximum separation of the two steps 600, as defined by the respective inner tubes 600, outer tubes 610 and retainers 612.

In use, the steps 600 provide two-stage movement of the lift platform 700. In a first stage, the operator places one or two feet on the first step 602. The first step 602 is suspended in the frame 202 at a height that is between the ground and a waist of a typical operator, thus at a convenient height for an operator to place at least one foot onto. The heights of the steps 600 in the rest condition are selected by selecting the lengths of the inner tubes 608, the outer tubes 610 and the length of the steel cable 804 descending from the pulleys 802. For example, the first step 602 can be suspended at a height of about 500 mm (about half a meter) from the bottom of the frame base 210 and thus above the ground. A downward force applied to the first step 602 applies an equal downward force to the second step 604 by the retainers 612 pulling down on the outer tubes 610 in the contractible link. The resulting downward force on the second step 604 is transferred to the attached portions of the steel cable 804, thus pulling the portions of the steel cable 804 attached to the second step 604 downwards (and thus the lift platform 700 upwards). In the second stage of the two-stage movement, the first step 602 has been pushed to the bottom of its travel in the frame 202, and rests on rest stops 410 towards the bottom of the frame 202, as shown in FIG. 4. The rest stops 410 are formed of ⁵⁄₁₆-inch steel bolts affixed to the frame 202. In this partially raised condition, the second step 604 is suspended at a first holding height between the ground and the operator's waist, such as at a height of about 200 mm, to allow the operator to conveniently access the second step 604 with their feet. In the second stage of the two-stage movement, a downward loading is applied to the second step 604, which consequently slides down the inner tubes 608, thereby contracting or "compressing" the contractible link, until the second step 604 reaches and bears upon the first step 602 (which acts as a form of rest for the second step 604). As the second step 604 is pushed down, the attached portions of the steel cable 804 are drawn further down from the twin pulleys 802, and the lift platform is moved to a second holding height in a fully raised condition.

The steps 600 are held in the frame 202 by the rear two of the C sections 206. The second step 604 is held in the frame 202 by the outer tubes 610 which are rigidly connected to the second step 604 and are dimensioned to fit into the rear C sections. The outer tubes 610 slidingly fit into the "C" part of the respective rear C sections, and move vertically in the rear C sections, which thus act as rails. The rear C sections provide bearing surfaces that bear on the outer surfaces of the outer tubes 610 to keep the second step 604 positioned and aligned relative to the frame 202. The first step 602 is held in both alignment and position in the frame 202 by the inner tubes 608 slidingly fitting into the outer tubes 610, which are held in the frame 202 by the rear C sections. The first step 602 includes two guide knobs 618, welded to the proximal ends of the inner tubes 608, which have horizontal cross sections that generally match the respective cross sections of the outer tubes 610, and thus slidingly fit into the rear two C sections for guiding the first step 602 in its vertical movement. The rear C sections guide the outer tubes 610 and the guide knobs 618 to guide the steps 200 linearly along the upright portion of the frame 202.

Each of the steps 600 includes a foot guard barrier 614 to stop one or more feet of the operator extending forward of either of the steps 600. This protects the operator from the moving parts of the example hand trolley 200, including the moving steel cable 804 and the lift platform 700, during either lifting or lowering of the lift platform 700. Each barrier 614 is formed of a steel sheet welded to or bent from each of the steps 600 and having a height of about 50 mm.

Each of the steps 600 includes a ridge 616 perpendicular to the guard barrier 614 and bisecting each of the steps 600 into two sides with approximate dimensions, to receive one foot on each side. The barrier 614 discourages a user from placing a foot along one of the steps 600 such that the heal and toe of the foot are aligned generally parallel to the axle 406, as this may cause the operator's knee and lower leg to fall substantially inside the frame 202 and potentially knock onto one of the top cross bar 402 or the second step 604 (if the foot is put on the first step 602). This would be a particular concern when a load is on the lift platform 700 and the operator is attempting to lower the lift platform 700 under control of their weight on one of the steps 600, as the steps 600 can raise rapidly if the load is heavy. Each ridge 616 is formed of a sheet of steel welded to the central part of each of the steps 600 generally aligned parallel to the sides of the frame 202 (i.e., in a plane perpendicular to the rotational axis of the axle 406). The height of each ridge 616 is approximately equal to half the height of each corresponding barrier 614, as shown in FIGS. 4, 6A and 6B.

Each of the steps 600 includes cross bars of 25-mm sided square steel tubing of 1.6-mm thickness.

Lift Platform 700

The lift platform is formed of the lift base 702 and the lift upright 704 affixed by welding into an "L"-shaped part, as shown in FIGS. 7A and 7B. The lift base 702 includes a framework of 6-mm thick steel straps, each about 40 mm wide, lying parallel to the frame base 210 (i.e., parallel to the ground with the example hand trolley 200 in the standing condition) and welded together to form a web or frame for supporting various loads. The lift base 702 is about 300 mm long and slightly less than 420 mm wide, as shown in FIGS. 5 and 7A, to allow it to fit closely into the frame base 210. The lift base 702 includes four steel straps arranged generally in parallel to the side cross bars 208 of the frame 202 (i.e., in a front-to-back direction relative to the example hand trolley 200), as shown in FIG. 5; these four parallel steel straps include two straps at the edges of the lift base 702 and two more steel straps generally evenly distributed between the side straps. The four parallel front-to-back straps are held with a front strap and back strap to form a web, as shown in FIG. 5.

The lift upright 704 is formed of a lift upright frame, including four angle irons at the edges of the frame (i.e., on the top edge, the bottom edge and the two side edges, as shown in FIG. 7B), with a steel mesh 706 affixed to the lift upright to form a supporting back for the lift platform 700 to support loads held by the example hand trolley 200. The lift upright frame includes a horizontal top member 712, a horizontal central member 714 and a horizontal bottom member 716. The horizontal top member 712, the horizontal central member 714 and the horizontal bottom member are formed using 25-mm sided, square, 3-mm thick and 318-mm long angle irons. The side members are 38-mm square, 3-mm thick, and 486-mm long angle irons. The central member 714 is generally parallel to and generally between the top member 712 and the bottom member 716, as shown in FIG. 7B.

The lift upright 704 includes two cable anchors 708 fastened to the central member 714. The cable anchors 708 are affixed towards the side edges of the lift upright 704, as shown in FIG. 7B. The cable anchors 708 are circular bearings for holding the forward portion of the steel cable 804, as shown in FIG. 4. The cable anchors 708 cause the lift platform to be raised by the cable 804 when the rear portions of the steel cable 804 are pulled down by the steps 600. The cable anchors 708 are approximately equally spaced from the centre of the lift platform 700 for providing a generally balanced upward urging force to the lift platform 700 when the steel cable 804 is pulled upwards.

The lift platform 700 includes two ball bearings 710 on each side of the lift upright 704, extending outwards and sideways (generally parallel to the axle) from the side members of the lift upright 704, as shown in FIG. 7B. The bearings 710 fit into the "C" part of the respective C sections 206. The bearings 710 each have a diameter of about 25 mm each and fit within the forward two vertical C sections 206 of the frame 202 to guide the lift platform 700 in a vertical, up-and-down path that is parallel to the C sections 206 (i.e., in a generally vertical path when the example hand trolley 200 is in the standing condition). The C sections 206 act as rails guiding the bearings 710, as shown in FIG. 5.

Pulley-Based Lifting Apparatus 800

In the pulley-based lifting apparatus 800, the twin pulleys 802 transfer the downward force applied by the operator 106 to the movable member 112 into an upward force on the lifting platform 104 using the cable 804 in tension, pulled around the twin pulleys 802. The cable 804 transfers the direction of the loading applied by the operator's foot or feet from a generally downward direction (applied to the movable member 112) into a generally upward direction (applied to the lifting platform 104).

The cable 804 is connected to the lift platform 700 to apply the lifting force along the same direction, and to the same point of the lift platform 700, during the vertical movement of the lift platform 700. The cable 804 is also connected to the centre of gravity of the lift platform 700 (the connection to the centre of gravity can include two or more connections that balance the load). Accordingly, the weight of the lift platform 700 is borne directly by the cable 804, thus reducing or avoiding torsional forces on the lift platform 700 to the sides (left or right) of the hand trolley 100. In contrast, for an example hand trolley that uses levers in the lifting mechanism (e.g., as described with reference to FIGS. 12A and 12B), the upward force on the lifting platform 700 may move to the left or right as the lifting platform 104 moves, thus allowing torsion due to the upward force not being applied centrally (i.e., balanced around the centre of gravity) to the lifting platform 700. These torsional forces may be significant when the lift platform 104 is loaded.

The two-stage movement used to lift and lower the lift platform 700 includes the moving parts (including the steps 600, the lift platform 700 and the pulley-based lifting apparatus 800) moving between three conditions: the rest condition (shown in FIG. 8A), the partial lift condition (shown in FIG. 8B) and the full lift condition (shown in FIG. 8C).

In the rest condition, the lift platform 700 is seated in the frame base 210 held down by its own weight. The steel cable 804 and the twin pulleys 802 allow the weight of the steps 600 to pull up on the cable anchors 708, but the weight of the lift platform 700 is greater than the weight of the steps 600, and thus in the rest condition, the lift platform 700 falls to its lowest possible extent, into the frame base 210, thus lifting the steps 600 to their highest possible extent, as shown in FIG. 8A. At its highest extent, the first step 602 is still convenient for an operator to access, e.g., the height of about 400 mm to 600 mm. To lift the lift platform 700, an operator applies a downward loading or force to the first step 602, which is greater than the force due to the weight of the lift platform 700 (and any load on the lift platform 700), thus lifting the lift platform 700 due to the force transfer in the cable 804. The additional weight on the first step 602 pushes it down to its lowest extent, which is defined by the rest stops 410 towards the lower part of the frame 202. The rest stops 410 are positioned to allow the first step 602 to travel as far as possible towards the bottom of the example hand trolley 200, and thus to provide a equal lifting distance to the lift platform 700.

With the first step 602 in its lowest position, the pulley-based lifting apparatus 800 is in the partial lift condition, as shown in FIG. 8B. As discussed hereinbefore, the downward force applied to the first step 602 applies a corresponding downward force to the second step 604 through the contractible link, thus the second step 604 is drawn down to an accessible height for the operator in the partial lift condition.

To lift the lift platform 700 to the full lift condition, the operator pushes down on the second step 604 thus applying additional upward force to the lift platform 700 through the pulley-based lifting apparatus 800. The contractible link allows the second step 602 to draw nearer to the first step 602, and thus "concertina" or rest adjacent to the first step 602, as shown in FIG. 8C. Having the second step 604 move closer to the first step 602 allows the lift platform 700 to be raised by a greater distance than that travelled by the first step 602, thus allowing the operator to apply force to each of the steps 600 when it is at or below a convenient height for the operator.

With the first step 602 at a height of about 630 mm from the ground, and with the first step 602 travelling downwards about 500 mm, and the second step 604 travelling down from the partial lift condition by about 200 mm, the lift platform 700 can be lifted by a distance of about 700 mm (e.g., 760 mm as shown in FIG. 8C).

The height of the lift platform 700 in the full lift condition can be a convenient height for an operator of typical build to access loads on the raised lift platform without substantially bending their back or moving into inconvenient or dangerous postures to lift loads to and from the example hand trolley 200.

Example Hold-Release Assembly 900

The example hold-release assembly 900 of the example hand trolley 200 is affixed to the frame 202 to hold the lift platform 700 in one of the raised conditions (i.e., including the partial lift condition and the full lift condition) when the lifting apparatus 800 is not holding the lift platform 700 in one of the raised conditions.

The example hold-release assembly 900 includes a pair of parallel 16-mm square solid steel rods 902 retained in a pair of respective 20-mm square 1.6-mm thick steel tubes 904.

The two tubes 904 are connected to the frame 202 by welds at about the same height up the Tight portion of the frame 202 and on the sides of the frame 202, and towards the upper portion of the frame 202, as shown in FIG. 3, to allow manual access and operation of the hold-release assembly 900 by the operator. The tubes 904 are fixed generally equally distant from the centre of the frame 202 to allow the rods 902 to hold the lift platform 700 without applying significant twisting, torsional or rotational forces to the lift platform 700, i.e., so the weight of the lift platform 700 is generally evenly distributed between the rods 902.

The rods 902 and tubes 904 are aligned generally parallel to the side cross bars 208 (i.e., in a generally front-to-back direction). The rods 902 are longitudinally movable along the respective tubes 904 for holding and releasing the lift platform 700 relative to the frame 202. The rods 902 are shaped to be able to move out of the respective tubes 904 to project into the path of the lift platform 700, thus the rods 902 can project from the tubes 904 to support the lift platform 700 in one of the raised conditions. In the partial lift condition, the rods 902 project beneath the top member of the lift upright 704, thus supporting the lift platform 700 in the partial lift condition. In the full lift condition, the rods 902 project beneath the central member of the lift upright 704, thus holding the lift platform 700 in the full lift condition. The rods 902 generally lie projecting from the respective tubes 904 due to an outwardly urging force provided by respective springs of the example hold-release assembly 900, including a compression spring 906 in each of the tubes 904.

The rods 902 include angular camming surfaces 916 on the lower sides of their distal ends that force the rods 902 into the tubes 904 when the top member or the central member, when ascending, strike the lower surfaces of the distal ends of the rods 902. The top member and the central member include camming surfaces on their upper edges that cooperate with the camming surfaces 916 on the rods 902 to urge them inwards. The rods 902 are struck into the tubes 904 by the top member and the central member, as they ascend, against the outwardly urging forces of the respective springs 906.

The example hold-release assembly 900 includes respective release handles 908 for the rods 902. Each of the release handles 908 is attached at one end to an inner end of one of the rods 902 and at the other end to a guide pin 910 which is affixed to the frame 202. Each of the release handles 908 can be a 25-mm wide and 6-mm thick steel strap extending generally parallel to the C sections 206 for a length of approximately 100 mm (about 4 inches). Each of the release handles 908 can be pulled back manually by an operator towards the back of the example hand trolley 200 and towards one of the back C sections 206 of the frame 202 to pull one of the rods 902 back into its corresponding one of the tubes 904, and thus out of the path of the lift platform 700. Each of the release handles 908 travels along its guide pin 910 and the rods 902 travel along their tubes 904, thus pulling on the spring 906. Each of the release handles 908 is held in a forward position by each compression spring 906; when manually activated by the operator and forced away from each spring 906, the release handles urge the rods 902 into the tubes 904 against the force applied by the compression spring 906 to each of the rods 902. The release handles 908 can be held in the grip or grasp of each hand of the operator with their fingers extending around each of the release handles 908 and each thumb extending around a corresponding one of the back C sections 206 to hold the example hold-release assembly 900 in the release condition, thus allowing the lift platform 700 to drop away from the raised conditions and the rods 902.

The example hold-release assembly 900 includes hand guards 912 that lie between the example hold-release assembly 900 and the moving parts of the lifting apparatus 800, in particular the twin pulleys 802 and the cable 804, to protect the operator's hand from danger and injury. The hand guards 912 are formed by flat plates that lie between the cable 804 and where the operator's hands (and primarily their fingers) are placed (as defined by the location at the release handles 908) to operate the example hold-release assembly 900.

Figure 13A:
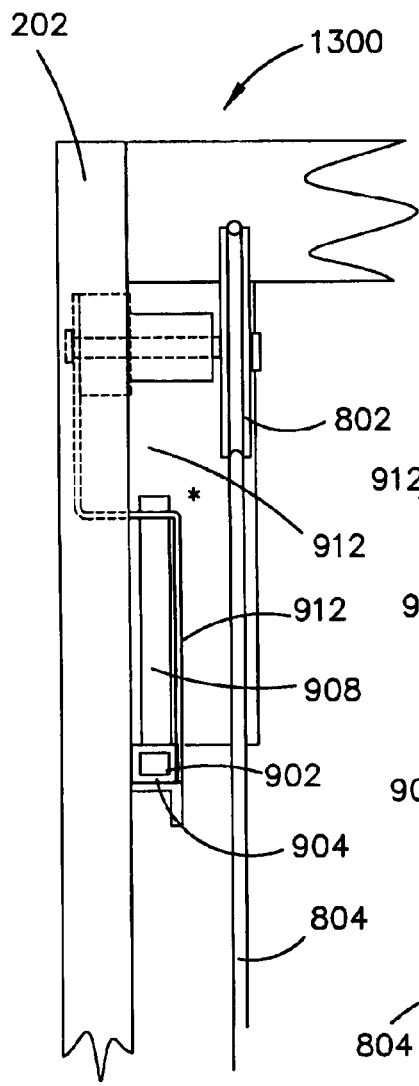
FIGS. 13A and 13B are diagrams of front and side views, respectively, of the example hand trolley with an alternative hold-release assembly.
Figure 13B:
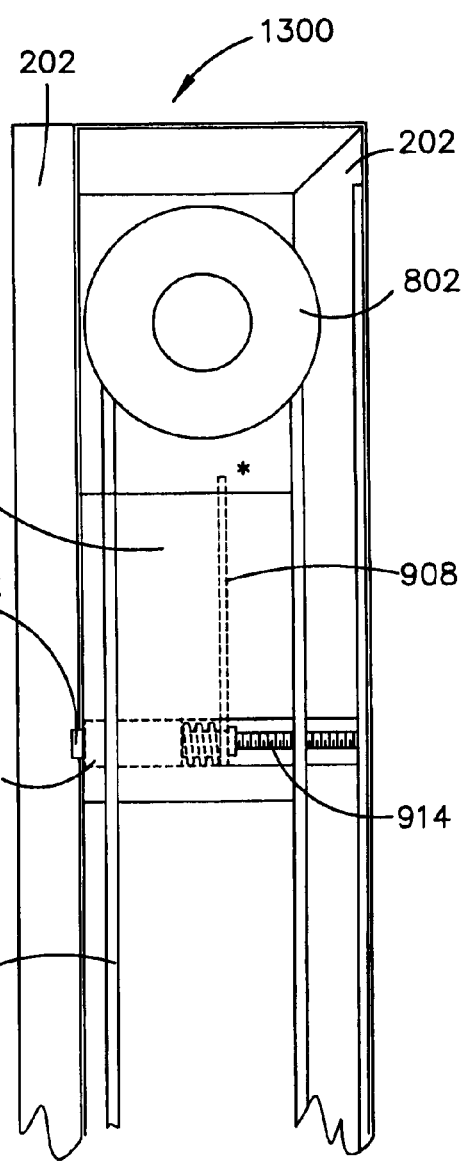

In an alternative hold-release assembly 1300, the guide pin 910 is removed, and the upper ends of the handles 908 are guided in respective generally longitudinal rectangular channels cut from generally horizontal parts of the hand guards 912, as shown in FIGS. 13A and 13B.

The alternative hold-release assembly 1300 includes the hand guards 912 equivalent to those in the example hold-release assembly 900, as shown in FIGS. 13A, 13B and 14A.

The example hold-release assembly 900 includes two threaded rods 914 rigidly connected to the respective rods 902 and lying in the respective tubes 904. Each of the threaded rods 914 includes two nuts 918, threaded onto each threaded rod on either side of a corresponding one of the lower ends of the release handles 908 (through which each threaded rod passes), as shown in FIG. 9, thus holding the lower ends of the release handles 908 rigidly connected to the respective rods 902 (to allow the rods 902 to be drawn into the tubes 904 by the release handles 908). The nuts 918 include inner nuts that sit against an inner end of each of the tubes 904, thus between the release handles 908 and the tubes 904, which define the forward position of the release handles 908. The threaded rods 914 control the projection distance of the rods 902 from the tubes 904 by defining the distance between each inner nut and the rods 902, which are rigidly connected to the inner ends of the threaded rods 914. The extent of the projection distance is selected to allow the camming surfaces 916 to cooperate with the top and central members when they ascend to push the rods 902 into the tubes 904, and to allow sufficient projection of the rods 902 beneath the top and central members to securely hold up the lift platform 700 in the partial lift condition or the full lift condition. The example hold-release assembly can be dismantled by unscrewing the threaded rods 914.

The hold-release assembly is affixed to the main body 102 of the hand trolley 100 at a height which is convenient for the operator 106 to access by hand when the operator is standing behind the hand trolley 100, and when the operator is stepping or standing on the movable member 112. The hold-release assembly is generally located at a height similar to or just below the handle 122.

Extendable Hand Trolley 1000

Figure 10:
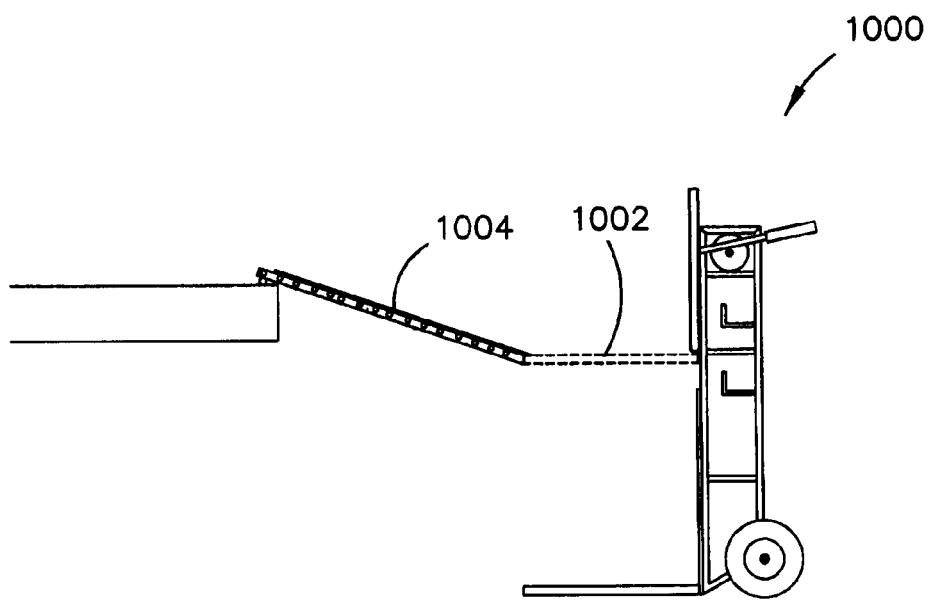
FIG. 10 is a schematic diagram of a side view of an extendable hand trolley.

An example hand trolley is an extendable hand trolley 1000 in which the lift platform 1002 includes an extension member, e.g., a conveyor extension 1004 as shown in FIG. 10, affixed to the distal edge of the lift base and rotatable about an axis along the front edge of the lift platform 1002 to effectively extend the surface of the lift base 902 to allow a load to be moved to or from the lift platform 1002 by rolling/conveying the load along the conveyor extension 1004. For example, the conveyor extension 1004 can provide a continuous loading platform between the lift platform 1002 (e.g., in the raised condition and at a height of about 700 mm) and a moving or storing platform (e.g., a truck tray) with a height slightly above or below that of the lift platform 1002 (e.g., a height of about 1000 mm), as shown in FIG. 10.

Extended Trolley 1100

Figure 11:
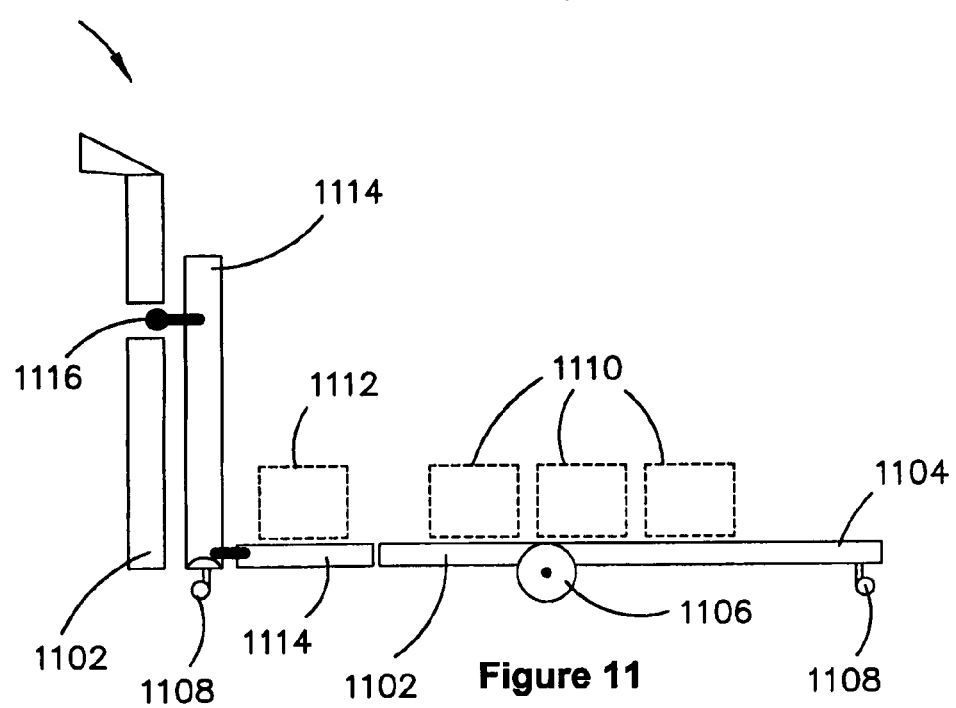
FIG. 11 is a schematic diagram of a side view of an extended hand trolley.

An example hand trolley can be an extended hand trolley 1100 in which a main body 1102 of the extended trolley 1100 includes a carrying tray 1104 as part of an extended base of the main body 1102. The carrying tray 1104 includes two main wheels 1106 and two or four (or six or eight) caster wheels 1108 located towards the front and back edges of the extended trolley 1100, as shown in FIG. 11. The extended trolley 1100 is generally supported by the main wheels 1106 and balanced by the caster wheels 1108 which allow rotation of the extended trolley 1100 in the plane of the ground by differential movement of the main wheels 1106. The extended trolley 1100 is not tipped backwards in the same manner as the hand trolley 100, but is kept and moved in a standing condition with loads spread across the carrying tray in a plurality of carrying locations 1110. Each load carried in one of the carrying locations 1110 can be moved to a lifting location 1112 above a lift 1114 which is a form of the lifting platform 104. The lift 1114 can be lifted by an operator pushing or pulling a movable bar 1116 which then correspondingly moves the lift 1114 in an equivalent manner to the lifting platform 104.

The extended trolley 1100 can be used in a supermarket or warehouse setting for conveniently lifting loads in the lifting location 1112 to a height suitable for stacking or unstacking shelves while transporting multiple loads around the supermarket or warehouse in the carrying locations 1110.

Prototypes

The example hand trolley 200 can be formed as a prototype hand trolley 1400, as shown in FIGS. 14A to 14F. In FIGS.

14A to 14F like reference signs refer to like features of the example hand trolley 200 and the prototype hand trolley 1400. As with the example hand trolley 200, the prototype hand trolley 1400 includes the lift platform 700 which moves between the rest condition (shown in FIGS. 14A and 14D), the partial lift condition (shown in FIGS. 14B and 14E) and the full lift condition (shown in FIGS. 14C and 14F).

Figure 15B:
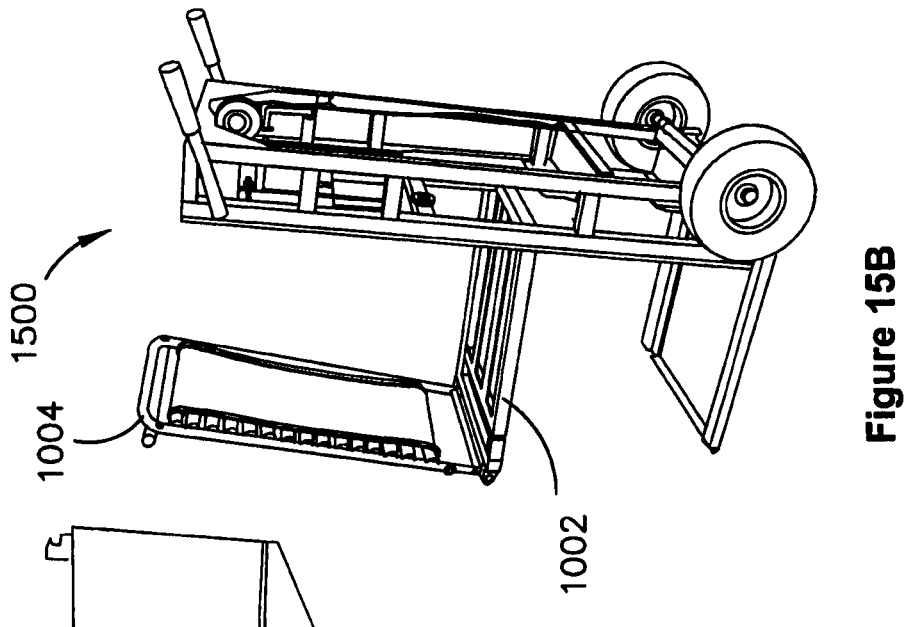
FIG. 15B is a diagram of a side perspective view of the prototype extendable hand trolley in a partial lift condition.
Figure 15A:
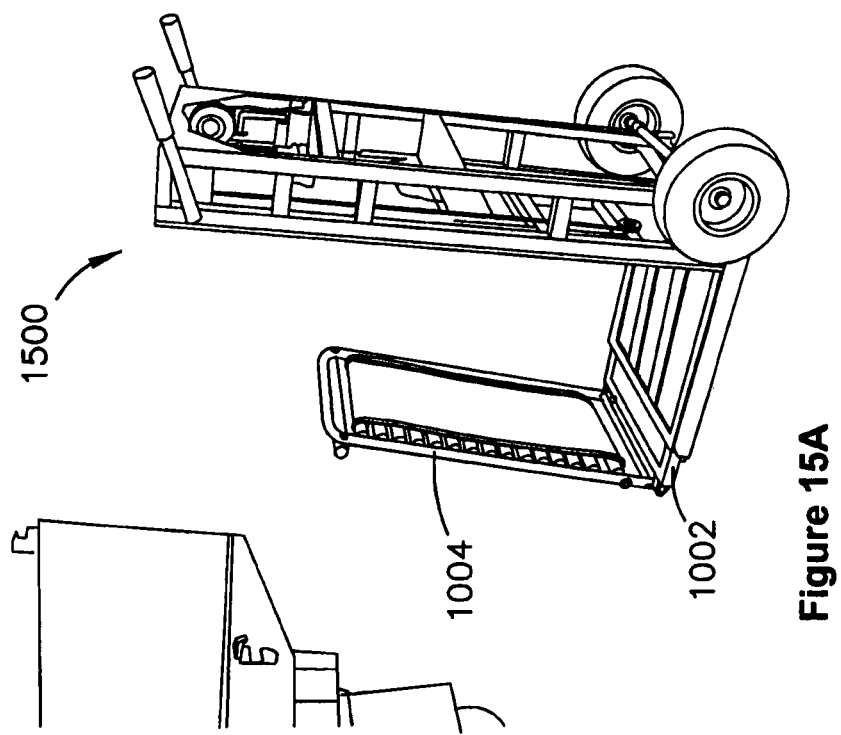
FIG. 15A is a diagram of a side perspective view of a prototype extendable hand trolley in a rest condition.
Figure 15D:
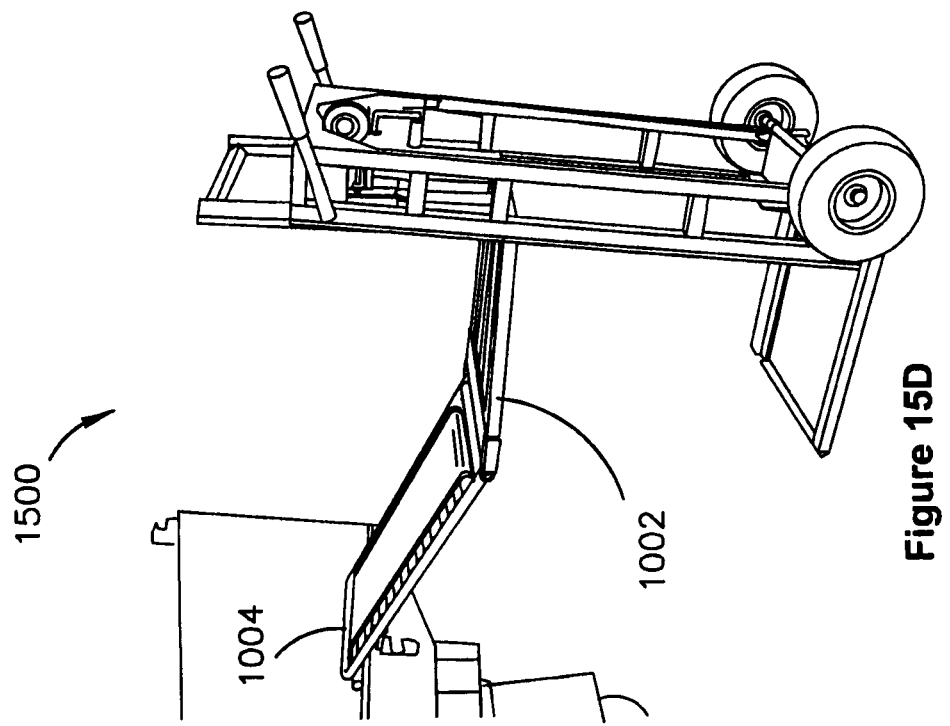
FIG. 15D is a diagram of a side perspective view of the prototype extendable hand trolley in an extended condition.
Figure 15C:
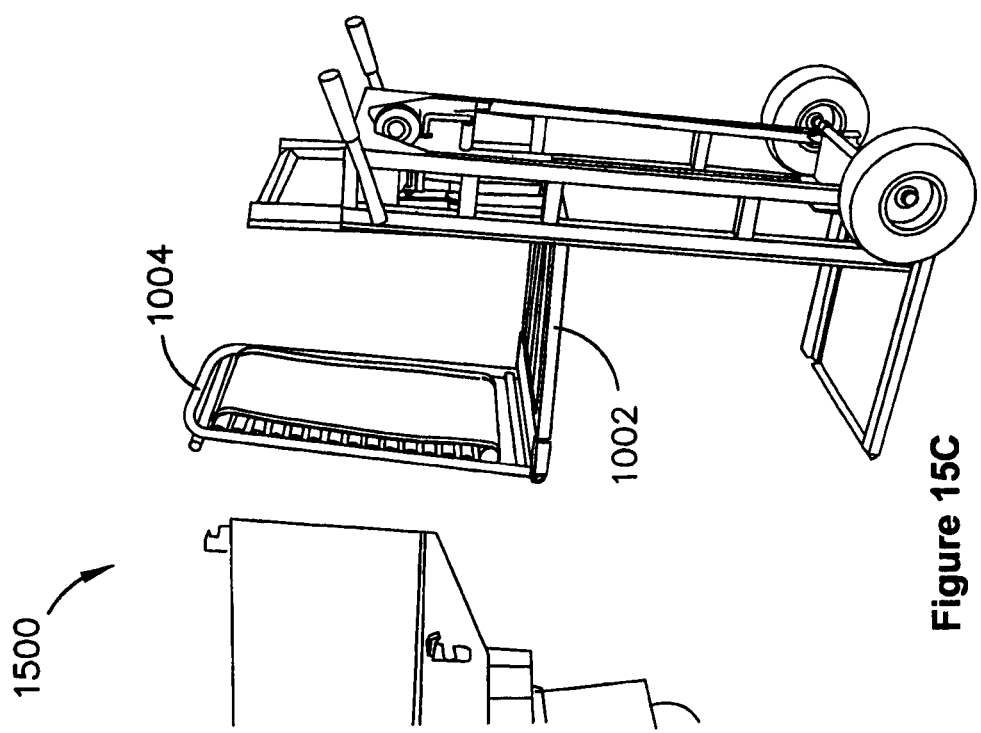
FIG. 15C is a diagram of a side perspective view of the prototype extendable hand trolley in a full lift condition.

The extendable hand trolley 1000 can be formed as a prototype extendable hand trolley 1500, which can lift equipment, such as a compactor, from the ground to a height suitable for loading into a truck, as shown in FIGS. 15A to 15D, in which like reference signs to FIG. 10 refer to like features of the extendable hand trolley 1000 and the prototype extendable hand trolley 1500. As with the extendable hand trolley 1000, the prototype extendable hand trolley 1500 can move from a rest condition (as shown in FIG. 15A) to a partial lift condition (as shown in FIG. 15B) and to a full lift or fully raised condition (as shown in FIGS. 15C and 15D); the prototype extendable hand trolley 1500 can also move to an extended condition (as shown in FIG. 15D) with the conveyor extension 1004 extended between the distal end of the lift platform 1002 and the truck tray. The load can be transported via the conveyor belts or rollers in the conveyor extension 1004, as shown in FIG. 15D. With the load on the lift platform 1002, the conveyor extension 1004 can be held in its closed position, adjacent the load, with a resilient strap, as shown in FIGS. 15A to 15C.

Figure 16A:
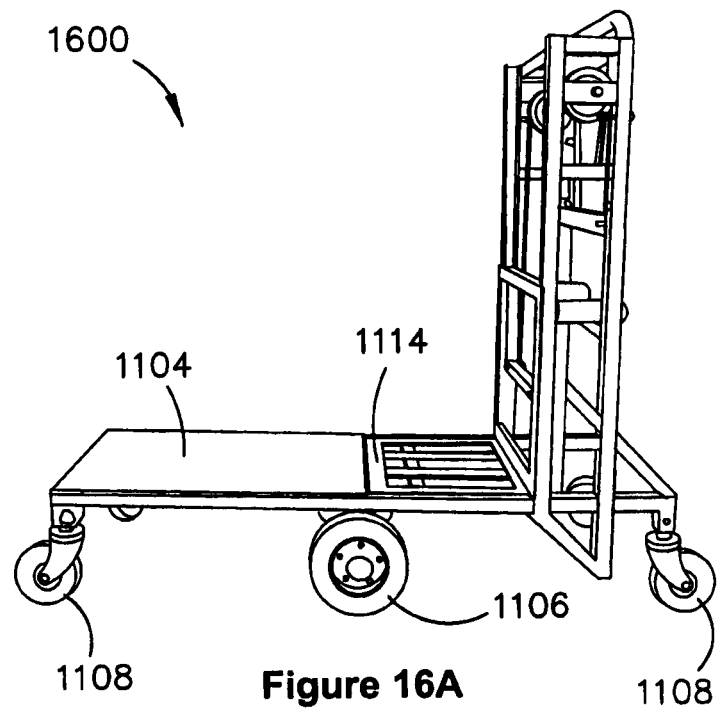
FIG. 16A is a diagram of a side perspective view of a prototype extended hand trolley in a rest condition.
Figure 16B:
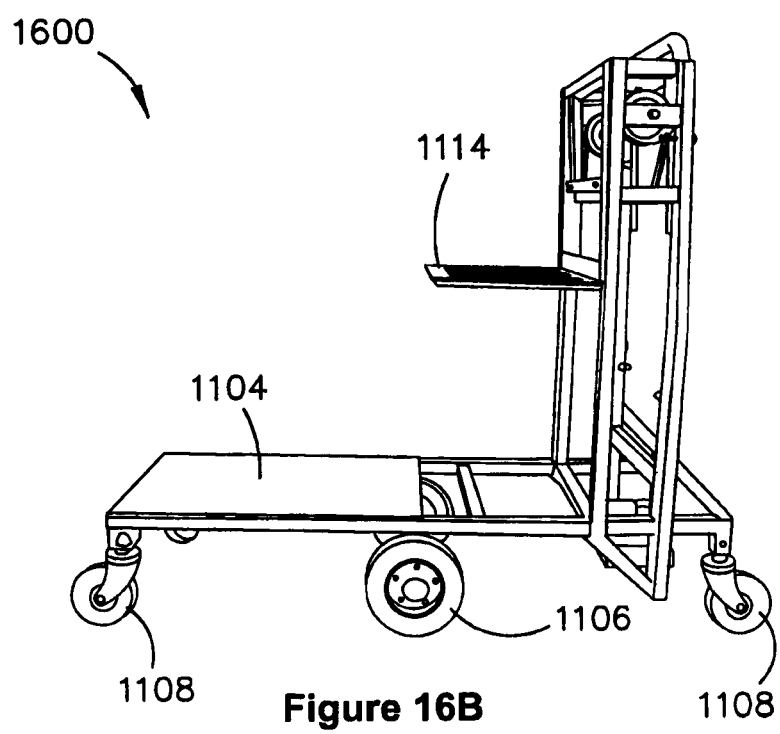
FIG. 16B is a diagram of a side perspective view of the prototype extended hand trolley in a full lift condition.

The extended trolley 1100 can be formed as a prototype extended trolley 1700, which can be operated between a rest condition, as shown in FIG. 16A, and a raised condition, as shown in FIG. 16B. In FIGS. 11, 16A and 16B, like reference signs refer to like features of the extended hand trolley 1100 and the prototype extended trolley 1700.

Alternatives

Figure 12A:
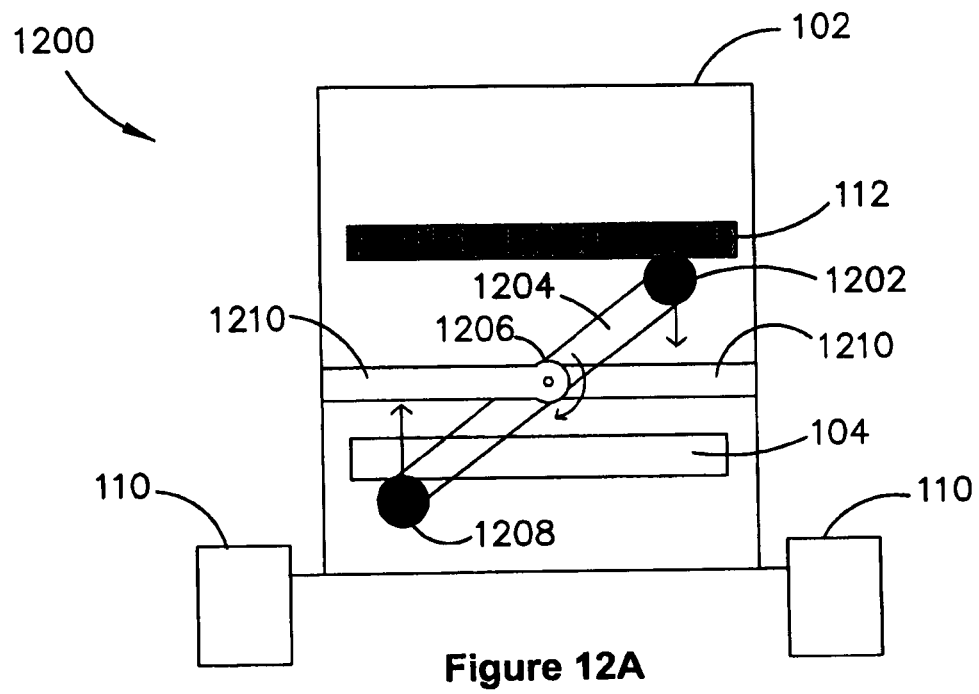
FIG. 12A is a schematic diagram of a back view of a lever-based lifting apparatus of the hand trolley.
Figure 12B:
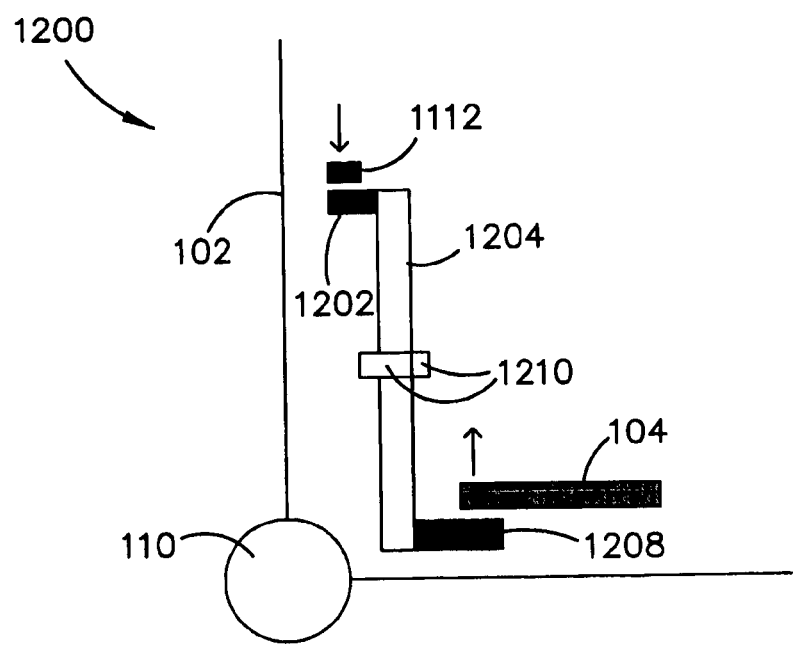
FIG. 12B is a schematic diagram of a side view of the lever-based lifting apparatus.

An example hand trolley may be formed using the lifting mechanism 114 including a lever-based lifting apparatus 1200 (instead of the pulley-based lifting apparatus 800) for transferring the force of the loading (applied by the operator's foot/feet) from the movable member 112 to the lifting platform 104. The lever-based lifting apparatus 1200 includes one or more levers rather than, or in addition to, cables and pulleys. In the lever-based lifting apparatus 1200, the movable member 112 is pushed down onto an upper projection 1202 which rotates a lever 1204 about a pivot 1206 between the movable member 112 and the lifting platform 104. The lever 1204 has a lower projection 1208 which is urged upwards by the rotation of the lever 1204 and is in mechanical contact with the lower side of the lifting platform 104 and urges the lifting platform 104 upwards as the movable member 112 is urged downward, as shown in FIGS. 12A and 12B. The pivot 1206 is held in a horizontal orientation generally perpendicular to the rotational axis 124 of the wheels 110 by two or more arms 1210 affixed to the main body 102 of the example hand trolley. The arms 1210 project to the sides of the main body 102 in gaps between the movable member 112, the upper projection 1202, the lower projection 1208 and the lifting platform 104 to allow movement of the moving parts without contacting the arms 1210.

The contractible link of the lifting mechanism 114, described above as comprising the inner tubes 608, retainers 612 and outer tubes 610, may instead be implemented using an alternative contractible link, such as cables, e.g., steel cables connected to and extending generally vertically between a lower first step and upper second step at the edges of the steps and extending (e.g., two cables or four cables at the horizontal corners of each step). Cable guides or guards are used to stop these cables interfering with other parts of the hand trolley 100 when they are compressed, and thus have loose lengths of cable. In alternative example hand trolleys, the contractible link may include the two inner members in the form of two inner tubes connected to the upper step, and the two sliding housings in the form of two outer tubes fitting around the inner tubes connected to the lower step.

The steps 600 may be configured to receive only one foot of the operator on each of the first steps 602 and the second step 604. In this configuration, the steps 600 include a foot pad sized to one foot and/or foot barriers to resist more than one foot being placed simultaneously on the steps 600. For example, each of the steps 600 can include additional ridges or barriers to prevent more than one foot applying force to each of the steps 600. This one-foot configuration may be preferable to discourage the operator from placing both feet on the steps 600, which may make it more difficult for the operator, standing on the hand trolley 100, to control the hand trolley 100 if it unbalances, e.g., in a direction away from the lifting platform 104 and base 116.

The pulleys 802 can be mounted below the hold-release assembly (e.g., between the example hold-release assembly 800 and the steps 600) thus protecting the operator's hands from contact with the moving parts of the hold-release assembly, e.g., the twin pulleys 802 and the cable 804. This may allow the hold-release assembly to be configured without hand guards, e.g., the hand guards 912.

The handle 122 may be configured to not include the top handle 212, thus encouraging the operator to hold the side handles, e.g., the side handles 214, which may encourage the operator to have better balance when using the hand trolley 100. The handle 122 may also be removable, e.g., for storage and transportation. For example, the side handles 214 may include threaded ends for screwing into or onto the main body 102 of the hand trolley 100, or the top handle 212 may removably slide onto the main body 102, or the side handles 214 can be curved handles that removably attach to the rear top of the main body 102.

The axle, e.g., the steel axle 406, which defines the rotational axis 124, can include two stub axles instead of one single axle. Each stub axle can connect the frame, e.g., by fitting into one of the bushings 408, to a respective one of the wheels 110, without extending across the back of the main body 102, e.g., between the bushings 408. This can allow the operator's foot to force the steps 600 below the level of the axle 406, and move the movable member 112 below the level of the rotational axis 124. Having a lower end position for the 600 can provide an additional lifting extent for the lifting platform 104. Alternatively, the lower end position can allow the apparatus include the steps 600 to be lowered to a lower starting position (e.g., from about 480 mm above ground to about 350 mm above ground), which can make the first/lower step 602 safer and easier to access, and can allow a greater initial foot force to be applied by the operator (due to the more comfortable starting position).

The hand trolley 100 can include forks and a cable clamp to catch portions of the cable 804 if the cable breaks, thus improving protection of the operator.

The lift platform 700 can include locking projections which have upper camming surfaces configured to cooperate with the camming surfaces 916 of the rods 902 to force the rods 902 into the tubes 904. The locking projections are attached to the vertical side members of the lift platform 700 at selected heights to hold the lift platform 700 in the partial lift condition and the full lift condition. The locking projections have lower engagement surfaces for resting on the top of the top surfaces of the rods 902 when the rods are extended to the hold the lift platform 700 in the partial lift condition and the full lift condition.

The lifting platform 104 can include a plurality of the locking projections, e.g., similar to the locking projections on the lift platform 700, which together forming a set of teeth, e.g., forming a ratchet. The teeth cooperate with a pawl mechanism, e.g., the rods 902, to releasably hold the lifting platform 104 at a selected one of a plurality of holding (or "engaged") heights once it has been raised. The locations of the teeth on the lifting platform 104 are selected to allow the lifting platform 104 to be held by the pawl mechanism at a plurality of convenient heights above the ground 118, as selected by the operator applying the foot force. For example, for a series of teeth on the lifting platform 104, the operator can lift the lifting platform 104 to a height that is a fraction of the full lift or partial lift condition, e.g., selected based on a height of a shelf or a vehicle tray up to which the load 108 is being lifted. In an example, the teeth can be affixed to back of the lift upright 704 (with the pawl affixed to the frame 202); alternatively, the teeth can be affixed to the frame 202 and the pawl to the lift platform 700. The pawl is releasable by the hold release mechanism to lower the lifting platform 104 from its engaged height.

The main body 102 can include a hand guard or plate on each of the inward-facing sides of the release handles 908 to discourage the operator's fingers from being caught between the release handles 908 and the frame 202. The hand guards can also be configured to allow access to the release handles 908 only from the outer sides of the main body 102, to discourage the operator from placing his or her hands into the frame between the release handles 908. The hand trolley 100 can include side plates substantially blocking access to the twin pulleys 802 to resist objects coming into contact with the pulleys 802.

The hand trolley 100 can include a protective mesh on the main body 102 to protect the operator from the load 108. For example, the protective mesh can be a metal mesh attached between the C sections 206 of the example hand trolley 200 to stop the operator inserting any objection from the back of the hand trolley through the upright 120 and to the moving parts of the lifting mechanism 102, the movable member 112, the lifting platform 104, or the moving load 108, etc. The mesh can be affixed between the rear C sections 206.

The hand trolley 100 can include small projections or platforms at the back of the hand trolley 100 on the main body 102 generally adjacent to and between the wheels 110, but leaving a space between the projections or platforms to place the operator's foot on the movable member 112. These platforms can allow the operator to step up onto the main body 102 before or after stepping on the steps 600, e.g., when the movable member 112 is in its highest location. For example, when the example hand trolley 200 is in the rest condition, it can be easier to step from the platform to the second step 602 (and back again) than to step directly from and to the floor.

Applications

Although the lifting mechanism 114, and in particular the pulley-based lifting apparatus 800 can be adapted to provide a mechanical advantage (i.e., an increase in the lifting force applied to the lifting platform 104 which is a multiplier of the force applied to the movable member 112), the example hand trolley 200 allows for lifting of the lift platform 700 by an equal distance to the depression of the steps 600 which allows the lift platform 700 to be lifted rapidly to a distance equal to one or two steps taken by the operator, thus reaching a height of about 700 mm in plurality of lifting stages, each one having little or no gearing or mechanical advantage. This height can be suitable height for a person lifting with good posture and for loading to and from common storage and transportation platforms. The hand trolley 100 can be configured in different sizes for different applications, e.g., a light-weight substantially aluminium trolley can be used for commercial and domestic applications, while a larger steel-framed trolley can be used for heavy commercial and industrial applications.

The hand trolley 100 can be used in a commercial hospitality environment, e.g., a hotel or restaurant, or a fanning environment, e.g., a vineyard, for transporting boxes of bottles or water, soft drink, wine and beer.

The lifting platform 104 can be used for lifting loads which are attached or embedded in the ground, such as fencing posts or star droppers. One more projections can be formed on the posts or star droppers at a height above the lifting platform 104 but close to the lifting platform 104. The operator 106 can then activate the lifting mechanism of the hand trolley 100 to lift the lifting platform 104, thereby engaging the lifting platform 104 beneath the projection from the post or star dropper, and pulling the post or star dropper out of the ground.

Interpretation

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

RELATED APPLICATIONS

This application is related to Australian Provisional Patent Application No. 2010903879, filed on 30 Aug. 2010, which is hereby incorporated by reference as if set forth in its entirety herein.

REFERENCE SIGNS LIST

| Part No. | Associated Phrase |
|---|---|
| 100 | hand trolley |
| 102 | main body |
| 104 | lifting platform |
| 106 | operator |
| 108 | load |
| 110 | wheels |
| 112 | movable member |
| 114 | lifting mechanism |
| 116 | base |
| 118 | ground |
| 120 | upright |
| 122 | handle |
| 124 | rotational axis |
| 200 | example hand trolley |
| 202 | frame |
| 204 | wheels |
| 206 | C sections |
| 208 | side cross bars |
| 210 | frame base |
| 212 | top handle |
| 214 | side handles |
| 402 | top cross bars |
| 406 | axle |
| 408 | bushings |
| 410 | rest stops |
| 600 | steps |
| 602 | first step |
| 604 | second step |
| 606 | anchor bolts |

-continued

| REFERENCE SIGNS LIST | |
|---|---|
| Part No. | Associated Phrase |
| 608 | inner tubes |
| 610 | outer tubes |
| 612 | retainers |
| 614 | barrier |
| 616 | ridge |
| 618 | guide knob |
| 700 | lift platform |
| 702 | lift base |
| 704 | lift upright |
| 706 | steel mesh |
| 708 | cable anchors |
| 710 | bearings |
| 712 | top member |
| 714 | central member |
| 716 | bottom member |
| 800 | pulley-based lifting apparatus |
| 802 | pulleys |
| 804 | cable |
| 900 | example hold-release assembly |
| 902 | rods |
| 904 | tubes |
| 906 | compression spring |
| 908 | release handles |
| 910 | guide pin |
| 912 | hand guards |
| 914 | threaded rods |
| 916 | camming surfaces |
| 918 | nuts |
| 1000 | extendable hand trolley |
| 1002 | lift platform |
| 1004 | conveyor extension |
| 1100 | extended hand trolley |
| 1102 | main body |
| 1104 | carrying tray |
| 1106 | main wheels |
| 1108 | caster wheels |
| 1110 | carrying locations |
| 1112 | lifting location |
| 1114 | lift |
| 1116 | movable bar |
| 1200 | lever-based lifting apparatus |
| 1202 | upper projection |
| 1204 | lever |
| 1206 | pivot |
| 1208 | lower projection |
| 1210 | arms |
| 1300 | alternative hold-release assembly |
| 1400 | prototype hand trolley |
| 1500 | prototype extendable hand trolley |
| 1600 | prototype extended hand trolley |

The invention claimed is:

1. A hand trolley including a main body and a lifting platform movable relative to the main body for applying a lifting force to a load by a foot force applied by a foot of an operator, including a hold-release assembly to hold the lifting platform in a raised condition and to release the lifting platform from the raised condition, wherein the hold-release assembly includes one or more rods that move to a holding condition to hold the lifting platform in the raised condition.

2. A hand trolley including a main body and a lifting platform movable relative to the main body for applying a lifting force to a load by a foot force applied by a foot of an operator, including a hold-release assembly to hold the lifting platform in a raised condition and to release the lifting platform from the raised condition, wherein the hold-release assembly includes one or more releasing mechanisms for operation by the operator to release the lifting platform.

3. A hand trolley including a main body and a lifting platform movable relative to the main body for applying a lifting force to a load by a foot force applied by a foot of an operator, including a lifting apparatus configured to receive the foot force in a plurality of stages for applying the lifting force, wherein the lifting apparatus includes:
a lower member for receiving a first portion of the foot force in a first stage; and
an upper member for receiving a second portion of the foot force in a subsequent second stage.

4. The hand trolley of claim 3, including a contractible link between the lower member and the upper member that defines a maximum separation of the upper member and the lower member.

5. The hand trolley of claim 4, wherein the contractible link includes at least one inner member, and at least one housing, the housing configured to slide over the inner member to contract the contractible link.

6. The hand trolley of claim 3, wherein the lower member is connected to the upper member such that applying the downward force to the lower member applies the lifting force, and applying the downward force to the upper member displaces the upper member downward relative to the lower member and apply the lifting force.

7. The hand trolley of claim 6, wherein the lower member is connected to the upper member to via a contractible link to apply the lifting force.

8. A hand trolley including a main body and a lifting platform movable relative to the main body for applying a lifting force to a load by a foot force applied by a foot of an operator, wherein the lifting platform moves a distance substantially equal to a distance moved by the foot while applying the foot force.

9. The hand trolley of claim 8, including at least one member engageable by the foot and a lifting mechanism, the member being configured to receive the foot force applied in a downward direction, and the lifting mechanism being mechanically associated with the member and the lifting platform to apply the lifting force to the lifting platform based on the foot force being applied to the member.

10. The hand trolley of claim 8, including a hold-release assembly to hold the lifting platform in a raised condition and to release the lifting platform from the raised condition.

11. The hand trolley of claim 10, wherein the hold-release assembly is configured hold the lifting platform at a plurality of holding heights.

12. The hand trolley of claim 8, including a lifting apparatus configured to receive the foot force in a plurality of stages for applying the lifting force.

13. The hand trolley of claim 8, including any one or more of:
at least one pulley, and a line in tension around the pulley to apply the lifting force based on the applied foot force;
at least one handle configured for the operator to pull up on to apply the foot force;
at least one foot platform configured to receive the foot of the operator to apply the foot force, wherein the foot platform includes a safety guard between the foot platform and moving parts of the hand trolley;
an extension member connected to the lifting platform for carrying the load to and from the lifting platform; and
a carrying tray adjacent the lifting platform for carrying the load when moving the hand trolley.

14. A method of operating a hand trolley, including:
applying a downward foot force by a foot to the hand trolley;

converting the downward foot force into a lifting force; and applying the lifting force to a lifting platform of the hand trolley, including moving the lifting platform by a distance substantially equal to a distance moved by the foot while applying the foot force.

15. The method of claim 14, including:

applying the downward foot force in a plurality of stages; and applying the lifting force in a corresponding plurality of stages.

16. The method of claim 14, wherein the foot force and the lifting force have substantially the same magnitude.

17. A method of operating a hand trolley, including:

applying a downward foot force by a foot to the hand trolley;

converting the downward foot force into a lifting force; and applying the lifting force to a lifting platform of the hand trolley, including applying the foot force on a same side of a rotational axis of at least one axle of the hand trolley as the lifting platform, such that the foot force and a weight of the lifting platform act in the same direction around the rotational axis.

18. A hand trolley including a main body and a lifting platform movable relative to the main body for applying a lifting force to a load by a foot force applied by a foot of an operator, including at least one axle connected to the main body defining a rotational axis of the hand trolley, wherein the foot force is applied on the same side of the rotational axis as the lifting platform such that the foot force and a weight of the load act in the same direction around the rotational axis.

\* \* \* \* \*